United States Patent
Hsu et al.

(10) Patent No.: US 8,934,180 B2
(45) Date of Patent: Jan. 13, 2015

(54) IMAGE CAPTURING LENS SYSTEM

(71) Applicant: LARGAN Precision Co., Ltd., Taichung (TW)

(72) Inventors: Po-Lun Hsu, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 48 days.

(21) Appl. No.: 13/937,623

(22) Filed: Jul. 9, 2013

(65) Prior Publication Data
US 2014/0340766 A1 Nov. 20, 2014

(30) Foreign Application Priority Data
May 17, 2013 (TW) ............................... 102117591 A

(51) Int. Cl.
*G02B 3/02* (2006.01)
*G02B 13/00* (2006.01)

(52) U.S. Cl.
CPC ................................. *G02B 13/0045* (2013.01)
USPC ........................................................ 359/714

(58) Field of Classification Search
CPC ................................................. G02B 13/0045
USPC ........................................................ 359/714
See application file for complete search history.

(56) References Cited

U.S. PATENT DOCUMENTS 8,189,273 B2   5/2012 Noda
2013/0050847 A1* 2/2013 Hsu et al. ...................... 359/714

* cited by examiner

*Primary Examiner* — James Jones
(74) *Attorney, Agent, or Firm* — Morris Manning & Martin LLP; Tim Tingkang Xia, Esq.

(57) ABSTRACT

An image capturing lens system includes, in order from an object side to an image side, a first lens element, a second lens element, a third lens element, a fourth lens element and a fifth lens element. The positive first lens element has a convex object-side surface at a paraxial region. Both of the positive second lens element and the negative third lens element have a concave object-side surface at a paraxial region and a convex image-side surface at a paraxial region. The positive fourth lens element has a convex image-side surface at a paraxial region. The fifth lens element has a concave image-side surface at a paraxial region, wherein the surfaces thereof are aspheric, and the image-side surface of the fifth lens element has at least one convex shape at an off-axis region. The image capturing lens system has a total of five lens elements with refractive power.

24 Claims, 17 Drawing Sheets

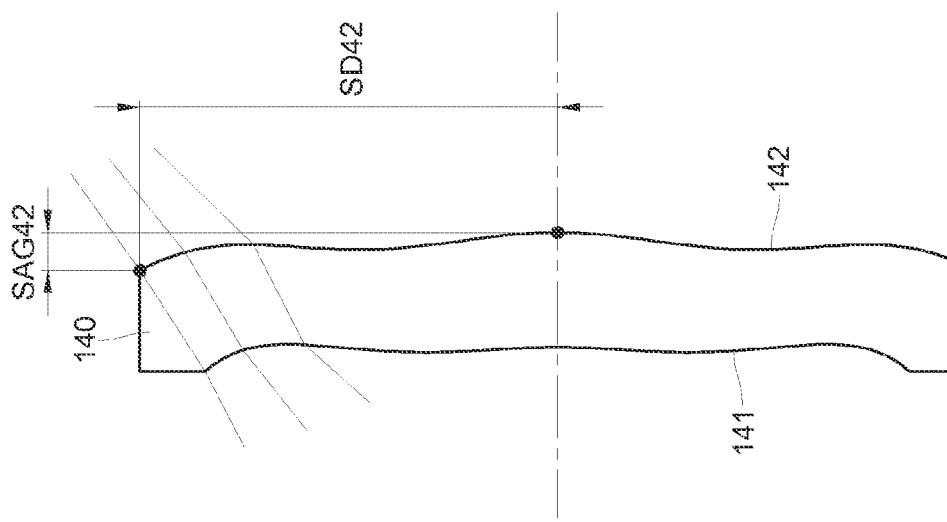

IMAGE CAPTURING LENS SYSTEM

RELATED APPLICATIONS

The application claims priority to Taiwan Application Serial Number 102117591, filed May 17, 2013, which is herein incorporated by reference.

BACKGROUND

1. Technical Field

The present disclosure relates to an image capturing lens system. More particularly, the present disclosure relates to a compact image capturing lens system applicable to the electronic products.

2. Description of Related Art

In recent years, with the popularity of mobile products having camera functionalities, the demand of miniaturized optical systems has been increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and the future trend of electronic products demands more functionality and a compact size, compact optical systems featuring better image quality has become the mainstream market.

The conventional optical systems with five-element lens structure such as the one disclosed in the U.S. Pat. No. 8,189,273 is limited in telephoto functionality due to the refractive power closest to the object side and the refractive power closest to the image side. It is thereby not favorable for reducing the back focal length of the optical system which results in a longer total track length. It is also not favorable for correcting the aberration of the off-axis which is thereby hard to be applied to a compact optical system featuring high image quality.

SUMMARY

According to one aspect of the present disclosure, an image capturing lens system includes, in order from an object side to an image side, a first lens element, a second lens element, a third lens element, a fourth lens element and a fifth lens element. The first lens element with positive refractive power has a convex object-side surface at a paraxial region. The second lens element with positive refractive power has a concave object-side surface at a paraxial region and a convex image-side surface at a paraxial region. The third lens element with negative refractive power has a concave object-side surface at a paraxial region and a convex image-side surface at a paraxial region. The fourth lens element with positive refractive power has a convex image-side surface at a paraxial region. The fifth lens element with refractive power has a concave image-side surface at a paraxial region, wherein both of an object-side surface and the image-side surface of the fifth lens element are aspheric, and the image-side surface of the fifth lens element has at least one convex shape at an off-axis region. The image capturing lens system has a total of five lens elements with refractive power. When a focal length of the image capturing lens system is f, a focal length of the fourth lens element is f4, a focal length of the fifth lens element is f5, a curvature radius of an object-side surface of the fourth lens element is R7, a curvature radius of the image-side surface of the fourth lens element is R8, a central thickness of the third lens element is CT3, and a central thickness of the fourth lens element is CT4, the following relationships are satisfied:

$0 < |f/f4 + |f/f5|| < 3.0;$ $-1.5 < R8/|R7| < 0;$ and $0.3 < CT4/CT3 < 1.6.$

According to another aspect of the present disclosure, an image capturing lens system includes, in order from an object side to an image side, a first lens element, a second lens element, a third lens element, a fourth lens element and a fifth lens element. The first lens element has positive refractive power. The second lens element with positive refractive power has a concave object-side surface at a paraxial region and a convex image-side surface at a paraxial region. The third lens element with negative refractive power has a concave object-side surface at a paraxial region. The fourth lens element has positive refractive power. The fifth lens element with refractive power has a concave image-side surface at a paraxial region, wherein both of an object-side surface and the image-side surface of the fifth lens element are aspheric, and the image-side surface of the fifth lens element has at least one convex shape at an off-axis region. The image capturing lens system has a total of five lens elements with refractive power. When a focal length of the image capturing lens system is f, a focal length of the first lens element is f1, a focal length of the second lens element is f2, a focal length of the fourth lens element is f4, and a focal length of the fifth lens element is f5, the following relationships are satisfied:

$0.2 < |f/f4 + |f/f5|| < 1.0;$ and $0 < f1/f2.$

BRIEF DESCRIPTION OF THE DRAWINGS

The disclosure can be more fully understood by reading the following detailed description of the embodiment, with reference made to the accompanying drawings as follows:

FIG. 17 shows SAG42 and SD42 of the fourth lens element of the image capturing lens system according to the 1st embodiment of the present disclosure.

DETAILED DESCRIPTION

Figure 1:
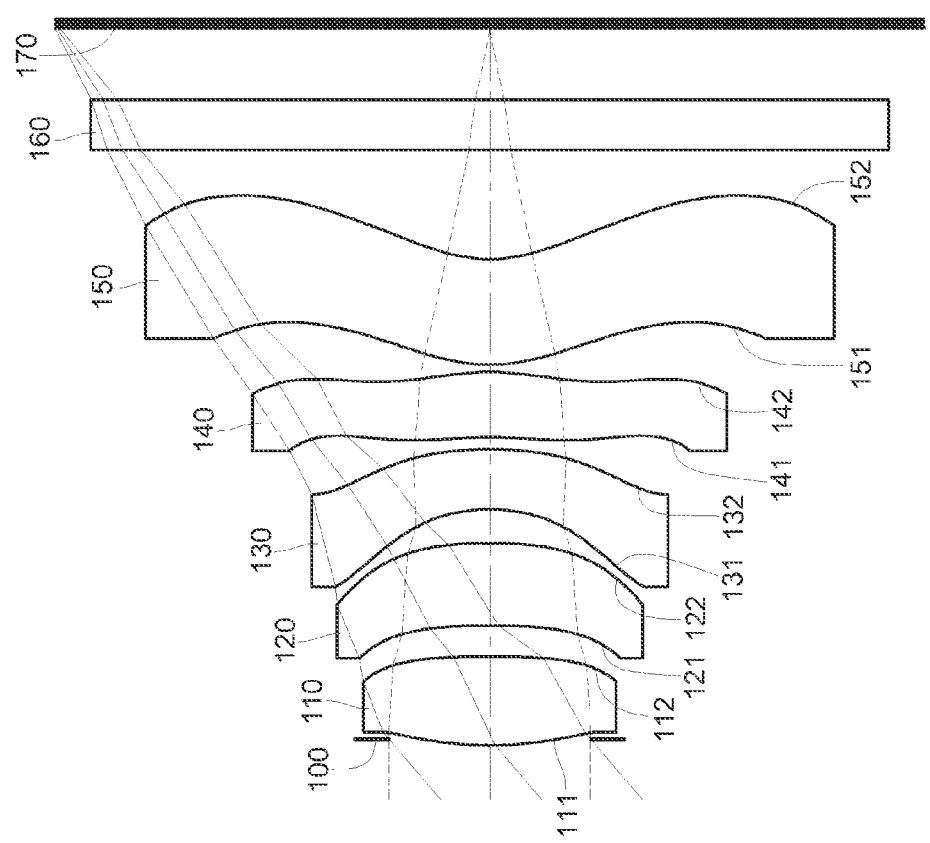
FIG. 1 is a schematic view of an image capturing lens system according to the 1st embodiment of the present disclosure.

An image capturing lens system includes, in order from an object side to an image side, a first lens element, a second lens element, a third lens element, a fourth lens element and a fifth lens element. The image capturing lens system has a total of five lens elements with refractive power.

The first lens element has positive refractive power, so that it provides the image capturing lens system with the positive refractive power as it needs to be which is favorable for reducing the total track length of the image capturing lens system. The first lens element has a convex object-side surface at a paraxial region and can have a convex image-side surface at a paraxial region, so that it is favorable for enhancing the arrangement of the positive refractive power and reducing the total track length.

The second lens element with positive refractive power has a concave object-side surface at a paraxial region and a convex image-side surface at a paraxial region. Therefore, it is favorable for correcting the astigmatism and enhancing the telephoto functionality of the image capturing lens system so as to reduce the total track length.

The third lens element with negative refractive power has a concave object-side surface at a paraxial region and a convex image-side surface at a paraxial region, so that it is favorable for correcting the aberration.

The fourth lens element has positive refractive power, so that it is favorable for reducing the sensitivity of the image capturing lens system. The image-side surface of the fourth lens element can be convex at a paraxial region and change to a concave shape and then a convex shape from the paraxial region to a peripheral region. Therefore, it is favorable for reducing the spherical aberration and reducing the angle at which the incident light projects onto an image sensor from the off-axis.

The fifth lens element with refractive power can have a convex object-side surface at a paraxial region and has a concave image-side surface at a paraxial region, wherein the image-side surface of the fifth lens element has at least one convex shape at an off-axis region. Therefore, the principal point of the image capturing lens system can be positioned away from an image plane so as to reduce the total track length, maintain a compact size and correct the aberration of the off-axis.

When a focal length of the image capturing lens system is f, a focal length of the fourth lens element is f4, and a focal length of the fifth lens element is f5, the following relationship is satisfied: $0<f/f4+|f/f5|<3.0$. Therefore, the fourth lens element together with the fifth lens element can effectively correct the aberration of the off-axis of the image capturing lens system so as to improve the image quality. Preferably, the following relationship is satisfied: $0.2<f/f4+|f/f5|<1.5$. More preferably, the following relationship is satisfied: $0.2<f/f4+|f/f5|<1.0$.

When a curvature radius of an object-side surface of the fourth lens element is R7, and a curvature radius of the image-side surface of the fourth lens element is R8, the following relationship is satisfied: $-1.5<R8/|R7|<0$. Therefore, it is favorable for correcting the astigmatism and the spherical aberration. Preferably, the following relationship is satisfied: $-1.0<R8/|R7|<0$.

When a central thickness of the third lens element is CT3, and a central thickness of the fourth lens element is CT4, the following relationship is satisfied: $0.3<CT4/CT3<1.6$. Therefore, the thicknesses of the third lens element and the fourth lens element will be favorable for assembling and arranging the lens elements of the image capturing lens system.

When a sum of a central thickness of the first lens element, a central thickness of the second lens element, the central thickness of the third lens element, the central thickness of the fourth lens element and a central thickness of the fifth lens element is ΣCT, and an axial distance between the object-side surface of the first lens element and the image-side surface of the fifth lens element is Td, the following relationship is satisfied: $0.75<\Sigma CT/Td<0.95$. Therefore, it is favorable for keeping the image capturing lens system compact.

When a distance in parallel with an optical axis from a maximum effective diameter position on the image-side surface of the fourth lens element to an axial vertex on the image-side surface of the fourth lens element is SAG42 (When the distance towards the object side of the image capturing lens system is negative, and when the distance towards the image side of the image capturing lens system is positive.), and a vertical distance between the maximum effective diameter position on the image-side surface of the fourth lens element and the optical axis is SD42, the following relationship is satisfied: $|SAG42/SD42|<0.25$. Therefore, it is favorable for manufacturing and molding the lens elements so as to keep the image capturing lens system more compact.

When a focal length of the first lens element is f1, and a focal length of the second lens element is f2, the following relationship is satisfied: $0<f1/f2$. Therefore, it is favorable for effectively enhancing the telephoto functionality and reducing the total track length. Preferably, the following relationship is satisfied: $0<f1/f2<1.0$.

When an axial distance between the image-side surface of the third lens element and the object-side surface of the fifth lens element is Dr6r9, and the central thickness of the fifth lens element is CT5, the following relationship is satisfied: $0.5<Dr6r9/CT5<1.3$. Therefore, it is favorable for keeping the image capturing lens system compact.

When a curvature radius of the object-side surface of the third lens element is R5, and a curvature radius of the image-side surface of the third lens element is R6, the following relationship is satisfied: $-0.60<(R5-R6)/(R5+R6)<-0.15$. Therefore, it is favorable for correcting the astigmatism of the image capturing lens system.

When a focal length of the third lens element is f3, and the focal length of the fourth lens element is f4, the following relationship is satisfied: −1.0<f3/f4<0. Therefore, it is favorable for correcting the aberration and reducing the sensitivity.

When an Abbe number of the third lens element is V3, and an Abbe number of the fourth lens element is V4, the following relationship is satisfied: 0.2<V3/V4<0.6. Therefore, the chromatic aberration of the image capturing lens system can be corrected.

When a curvature radius of the object-side surface of the fifth lens element is R9, and a curvature radius of the image-side surface of the fifth lens element is R10, the following relationship is satisfied: 0<|(R9−R10)/(R9+R10)|<0.5. Therefore, it is favorable for effectively correcting the astigmatism of the image capturing lens system.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Furthermore, surfaces of each lens element can be arranged to be aspheric, because the aspheric surface of the lens element is easy to form a shape other than spherical surface so as to have more controllable variables for eliminating the aberration thereof, and to further decrease the required number of the lens elements. Therefore, the total track length of the image capturing lens system can also be reduced.

According to the image capturing lens system of the present disclosure, there can include at least one stop which can be disposed between an imaged object and the first lens element, between every lens elements, or between the last lens element and the image plane. The stop can be, such as an aperture stop, a glare stop, or a field stop. Said glare stop or said field stop is for eliminating the stray light and thereby improving the image quality thereof.

According to the image capturing lens system of the present disclosure, the stop can be configured as a front stop or a middle stop. A front stop disposed between the imaged object and the first lens element can provide a longer distance between an exit pupil of the system and the image plane and which improves the image-sensing efficiency of the image sensor. A middle stop disposed between the first lens element and the image plane is favorable for enlarging the field of view of the mage capturing lens system and thereby provides a wider field of view for the same.

According to the image capturing lens system of the present disclosure, the image capturing lens system is featured with good correction ability and high image quality, and can be applied to 3D (three-dimensional) image capturing applications, in products such as digital cameras, mobile devices and tablets.

According to the above description of the present disclosure, the following 1st-8th specific embodiments are provided for further explanation.

1st Embodiment

Figure 2:
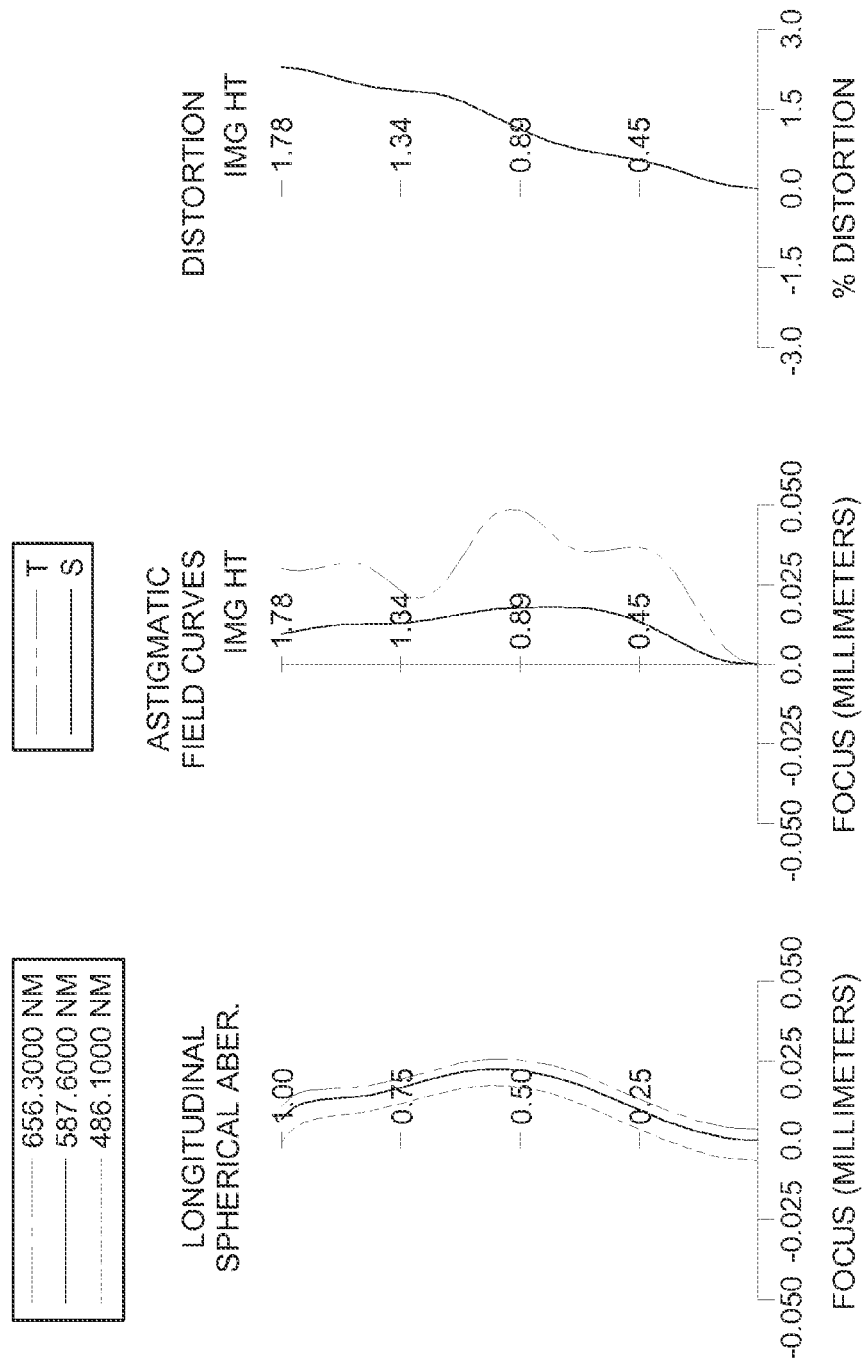
FIG. 2 shows spherical aberration curves, astigmatic field curves and a distortion curve of the image capturing lens system according to the 1st embodiment.

FIG. 1 is a schematic view of an image capturing lens system according to the 1st embodiment of the present disclosure. FIG. 2 shows spherical aberration curves, astigmatic field curves and a distortion curve of the image capturing lens system according to the 1st embodiment. In FIG. 1, the image capturing lens system includes, in order from an object side to an image side, an aperture stop 100, a first lens element 110, a second lens element 120, a third lens element 130, a fourth lens element 140, a fifth lens element 150, an IR-cut filter 160 and an image plane 170. The image capturing lens system has a total of five lens elements (110-150) with refractive power.

The first lens element 110 with positive refractive power has a convex object-side surface 111 at a paraxial region and a convex image-side surface 112 at a paraxial region, and is made of plastic material. The object-side surface 111 and the image-side surface 112 of the first lens element 110 are aspheric.

The second lens element 120 with positive refractive power has a concave object-side surface 121 at a paraxial region and a convex image-side surface 122 at a paraxial region, and is made of plastic material. The object-side surface 121 and the image-side surface 122 of the second lens element 120 are aspheric.

The third lens element 130 with negative refractive power has a concave object-side surface 131 at a paraxial region and a convex image-side surface 132 at a paraxial region, and is made of plastic material. The object-side surface 131 and the image-side surface 132 of the third lens element 130 are aspheric.

The fourth lens element 140 with positive refractive power has a concave object-side surface 141 at a paraxial region and a convex image-side surface 142 at a paraxial region, and is made of plastic material. The object-side surface 141 and the image-side surface 142 of the fourth lens element 140 are aspheric. Furthermore, the image-side surface 142 of the fourth lens element 140 is convex at the paraxial region and changes to a concave shape and then a convex shape from the paraxial region to a peripheral region.

The fifth lens element 150 with positive refractive power has a convex object-side surface 151 at a paraxial region and a concave image-side surface 152 at a paraxial region, and is made of plastic material. The object-side surface 151 and the image-side surface 152 of the fifth lens element 150 are aspheric. Furthermore, the image-side surface 152 of the fifth lens element 150 has at least one convex shape at an off-axis region.

The IR-cut filter 160 is made of glass and located between the fifth lens element 150 and the image plane 170, and will not affect the focal length of the image capturing lens system.

The equation of the aspheric surface profiles of the aforementioned lens elements of the 1st embodiment is expressed as follows:

$$X(Y) = (Y^2/R) \Big/ \Big(1 + sqrt\big(1 - (1+k) \times (Y/R)^2\big)\Big) + \sum_i (Ai) \times (Y^i),$$

wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the image capturing lens system according to the 1st embodiment, a focal length of the image capturing lens system is f, an f-number of the image capturing lens system is Fno, and half of the maximal field of view of the image capturing lens system is HFOV; these parameters have the following values: f=2.04 mm; Fno=2.45; and HFOV=40.4 degrees.

In the image capturing lens system according to the 1st embodiment, an Abbe number of the third lens element 130 is V3, and an Abbe number of the fourth lens element 140 is V4, the following relationship is satisfied: V3/V4=0.42.

In the image capturing lens system according to the 1st embodiment, a central thickness of the third lens element 130 is CT3, and a central thickness of the fourth lens element 140 is CT4, the following relationship is satisfied: CT4/CT3=1.08.

In the image capturing lens system according to the 1st embodiment, an axial distance between the image-side surface 132 of the third lens element 130 and the object-side surface 151 of the fifth lens element 150 is Dr6r9, and a central thickness of the fifth lens element 150 is CT5, the following relationship is satisfied: Dr6r9/CT5=0.80.

In the image capturing lens system according to the 1st embodiment, a sum of a central thickness of the first lens element 110, a central thickness of the second lens element 120, the central thickness of the third lens element 130, the central thickness of the fourth lens element 140 and the central thickness of the fifth lens element 150 is ΣCT, and an axial distance between the object-side surface 111 of the first lens element 110 and the image-side surface 152 of the fifth lens element 150 is Td, the following relationship is satisfied: ΣCT/Td=0.83.

In the image capturing lens system according to the 1st embodiment, the focal length of the image capturing lens system is f, a focal length of the fourth lens element 140 is f4, and a focal length of the fifth lens element 150 is f5, the following relationship is satisfied: f/f4+|f/f5|=0.52.

In the image capturing lens system according to the 1st embodiment, a curvature radius of the object-side surface 131 of the third lens element 130 is R5, and a curvature radius of the image-side surface 132 of the third lens element 130 is R6, the following relationship is satisfied: (R5−R6)/(R5+R6)=−0.40.

In the image capturing lens system according to the 1st embodiment, a curvature radius of the object-side surface 141 of the fourth lens element 140 is R7, and a curvature radius of the image-side surface 142 of the fourth lens element 140 is R8, the following relationship is satisfied: R8/|R7|=−0.70.

In the image capturing lens system according to the 1st embodiment, a curvature radius of the object-side surface 151 of the fifth lens element 150 is R9, and a curvature radius of the image-side surface 152 of the fifth lens element 150 is R10, the following relationship is satisfied: |(R9−R10)/(R9+R10)|=0.08.

In the image capturing lens system according to the 1st embodiment, a focal length of the first lens element 110 is f1, and a focal length of the second lens element 120 is f2, the following relationship is satisfied: f1/f2=0.35.

In the image capturing lens system according to the 1st embodiment, a focal length of the third lens element 130 is f3, and the focal length of the fourth lens element 140 is f4, the following relationship is satisfied: f3/f4=−0.41.

FIG. 17 shows SAG42 and SD42 of the fourth lens element according to FIG. 1. In FIG. 17, a distance in parallel with an optical axis from a maximum effective diameter position on the image-side surface 142 of the fourth lens element 140 to an axial vertex on the image-side surface 142 of the fourth lens element 140 is SAG42 (When the distance towards the object side of the image capturing lens system is negative, and when the distance towards the image side of the image capturing lens system is positive.), and a vertical distance between the maximum effective diameter position on the image-side surface 142 of the fourth lens element 140 and the optical axis is SD42, the following relationship is satisfied: |SAG42/SD42|=0.08.

The detailed optical data of the 1st embodiment are shown in Table 1 and the aspheric surface data are shown in Table 2 below.

TABLE 1

1st Embodiment
f = 2.04 mm, Fno = 2.45, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.026 | | | | |
| 2 | Lens 1 | 1.430 | ASP | 0.367 | Plastic | 1.544 | 55.9 | 2.08 |
| 3 | | −4.888 | ASP | 0.128 | | | | |
| 4 | Lens 2 | −2.876 | ASP | 0.342 | Plastic | 1.544 | 55.9 | 5.96 |
| 5 | | −1.588 | ASP | 0.138 | | | | |
| 6 | Lens 3 | −0.735 | ASP | 0.248 | Plastic | 1.640 | 23.3 | −2.24 |
| 7 | | −1.706 | ASP | 0.050 | | | | |
| 8 | Lens 4 | −1.518 | ASP | 0.269 | Plastic | 1.544 | 55.9 | 5.45 |
| 9 | | −1.067 | ASP | 0.030 | | | | |
| 10 | Lens 5 | 0.678 | ASP | 0.437 | Plastic | 1.544 | 55.9 | 13.66 |
| 11 | | 0.576 | ASP | 0.450 | | | | |
| 12 | IR-cut filter | Plano | | 0.210 | Glass | 1.517 | 64.2 | — |
| 13 | | Plano | | 0.292 | | | | |
| 14 | Image | Plano | | — | | | | |

Note:
Reference wavelength is 587.6 nm (d-line).

TABLE 2

Aspheric Coefficients

| Surface # | | | | | |
|---|---|---|---|---|---|
| | 2 | 3 | 4 | 5 | 6 |
| k = | −6.2480E+00 | −1.0000E+00 | 4.2598E+00 | −3.4595E+01 | −1.0544E+00 |
| A4 = | 9.0074E−02 | −5.7561E−01 | −6.4693E−01 | −1.3123E+00 | −1.4946E+0e0 |
| A6 = | −9.3179E−01 | −1.4779E+00 | 4.7392E−01 | 4.6237E−01 | 2.9400E+00 |
| A8 = | 1.0032E+00 | 1.3710E+00 | −1.4111E+01 | −1.3128E+00 | −1.5293E+00 |
| A10 = | −1.2715E+01 | −4.3851E+00 | 6.2086E+01 | 2.7877E+00 | 1.3343E+01 |
| A12 = | 1.5365E+00 | −1.3300E+01 | −1.5740E+02 | 8.4249E−01 | −3.3164E+01 |
| A14 = | −7.3228E+00 | 1.3764E+01 | 1.5389E+02 | −3.1160E+00 | 2.4959E+01 |

| Surface # | | | | | |
|---|---|---|---|---|---|
| | 7 | 8 | 9 | 10 | 11 |
| k = | −1.2247E+00 | −5.0000E+01 | −1.4881E+00 | −2.0218E+00 | −3.5220E+00 |
| A4 = | −9.8249E−01 | 1.6944E+00 | 1.7601E+00 | −1.0091E+00 | −3.9179E−01 |
| A6 = | 1.8190E+00 | −6.4711E+00 | −2.5667E+00 | 1.6247E+00 | 4.8751E−01 |
| A8 = | −2.6683E+00 | 1.5608E+01 | 1.0363E+00 | −1.8837E+00 | −4.7290E−01 |
| A10 = | −6.6958E−01 | −2.6525E+01 | 7.5558E−01 | 1.3356E+00 | 2.7860E−01 |
| A12 = | 1.2714E+00 | 2.5118E+01 | −1.0292E+00 | −5.4801E−01 | −9.5102E−02 |
| A14 = | −5.0134E−01 | −1.0092E+01 | 4.2377E−01 | 1.1989E−01 | 1.6961E−02 |
| A16 = | — | — | −5.4449E−02 | −1.0671E−02 | −1.2321E−03 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
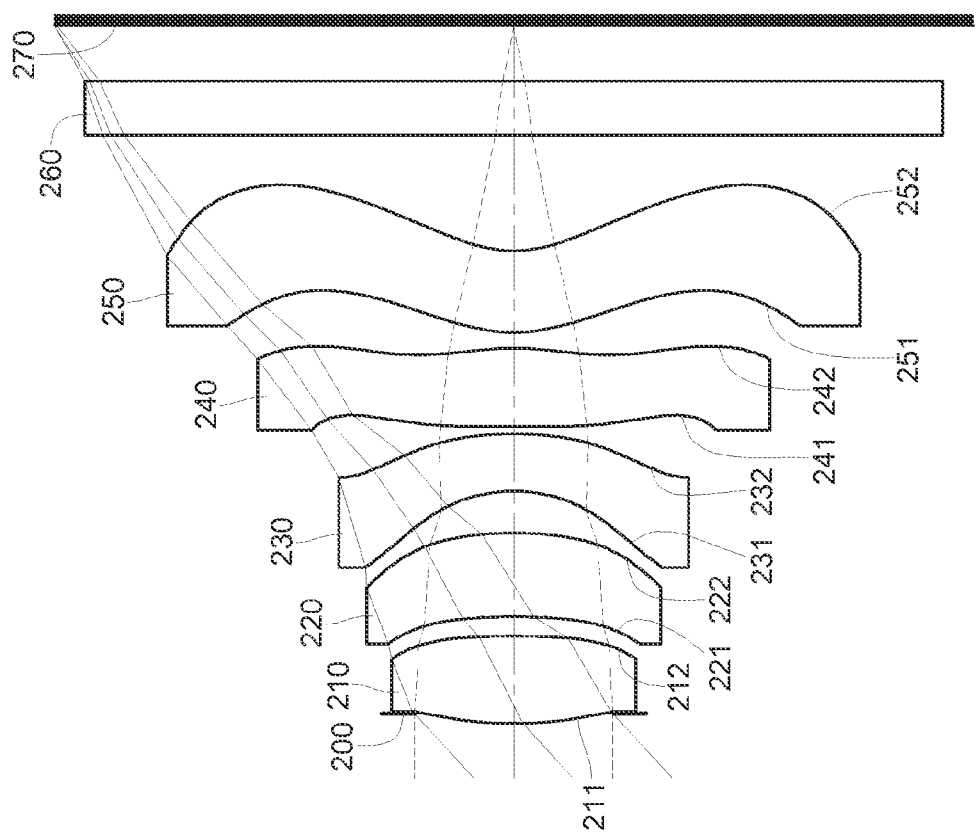
FIG. 3 is a schematic view of an image capturing lens system according to the 2nd embodiment of the present disclosure.
Figure 4:
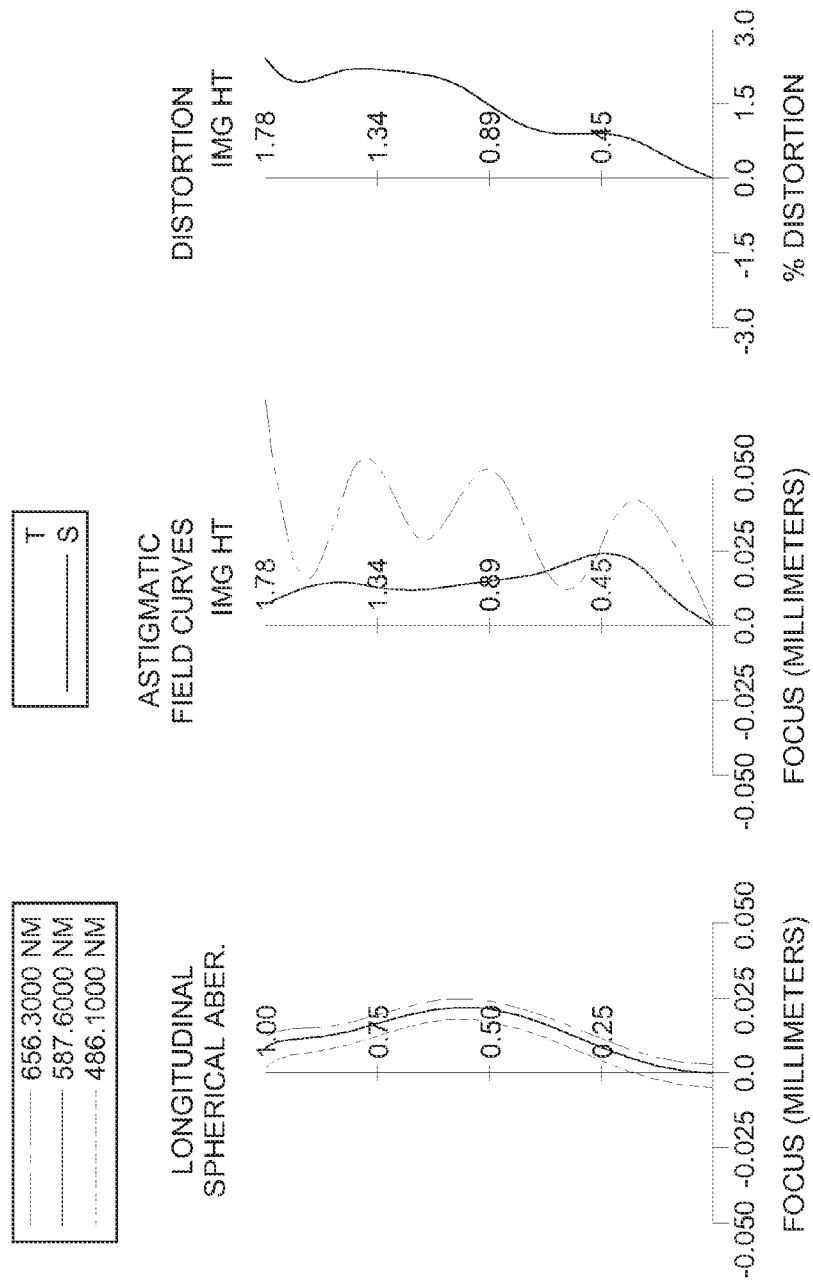
FIG. 4 shows spherical aberration curves, astigmatic field curves and a distortion curve of the image capturing lens system according to the 2nd embodiment.

FIG. 3 is a schematic view of an image capturing lens system according to the 2nd embodiment of the present disclosure. FIG. 4 shows spherical aberration curves, astigmatic field curves and a distortion curve of the image capturing lens system according to the 2nd embodiment. In FIG. 3, the image capturing lens system includes, in order from an object side to an image side, an aperture stop 200, a first lens element 210, a second lens element 220, a third lens element 230, a fourth lens element 240, a fifth lens element 250, an IR-cut filter 260 and an image plane 270. The image capturing lens system has a total of five lens elements (210-250) with refractive power.

The first lens element 210 with positive refractive power has a convex object-side surface 211 at a paraxial region and a convex image-side surface 212 at a paraxial region, and is made of plastic material. The object-side surface 211 and the image-side surface 212 of the first lens element 210 are aspheric.

The second lens element 220 with positive refractive power has a concave object-side surface 221 at a paraxial region and a convex image-side surface 222 at a paraxial region, and is made of plastic material. The object-side surface 221 and the image-side surface 222 of the second lens element 220 are aspheric.

The third lens element 230 with negative refractive power has a concave object-side surface 231 at a paraxial region and a convex image-side surface 232 at a paraxial region, and is made of plastic material. The object-side surface 231 and the image-side surface 232 of the third lens element 230 are aspheric.

The fourth lens element 240 with positive refractive power has a concave object-side surface 241 at a paraxial region and a convex image-side surface 242 at a paraxial region, and is made of plastic material. The object-side surface 241 and the image-side surface 242 of the fourth lens element 240 are aspheric. Furthermore, the image-side surface 242 of the fourth lens element 240 is convex at the paraxial region and changes to a concave shape and then a convex shape from the paraxial region to a peripheral region.

The fifth lens element 250 with negative refractive power has a convex object-side surface 251 at a paraxial region and a concave image-side surface 252 at a paraxial region, and is made of plastic material. The object-side surface 251 and the image-side surface 252 of the fifth lens element 250 are aspheric. Furthermore, the image-side surface 252 of the fifth lens element 250 has at least one convex shape at an off-axis region.

The IR-cut filter 260 is made of glass and located between the fifth lens element 250 and the image plane 270, and will not affect the focal length of the image capturing lens system.

The detailed optical data of the 2nd embodiment are shown in Table 3 and the aspheric surface data are shown in Table 4 below.

TABLE 3

2nd Embodiment
f = 1.88 mm, Fno = 2.45, HFOV = 42.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.038 | | | | |

TABLE 3-continued

2nd Embodiment
f = 1.88 mm, Fno = 2.45, HFOV = 42.6 deg.

| Surface # | | Curvature Radius | | Thickness | Material | Index | Abbe # | Focal Length |
|---|---|---|---|---|---|---|---|---|
| 2 | Lens 1 | 1.368 | ASP | 0.340 | Plastic | 1.544 | 55.9 | 1.92 |
| 3 | | −4.015 | ASP | 0.075 | | | | |
| 4 | Lens 2 | −2.843 | ASP | 0.326 | Plastic | 1.544 | 55.9 | 5.54 |
| 5 | | −1.523 | ASP | 0.162 | | | | |
| 6 | Lens 3 | −0.644 | ASP | 0.223 | Plastic | 1.639 | 23.5 | −1.92 |
| 7 | | −1.543 | ASP | 0.030 | | | | |
| 8 | Lens 4 | −5.263 | ASP | 0.303 | Plastic | 1.544 | 55.9 | 2.64 |
| 9 | | −1.152 | ASP | 0.062 | | | | |
| 10 | Lens 5 | 0.619 | ASP | 0.317 | Plastic | 1.535 | 55.7 | −9.24 |
| 11 | | 0.452 | ASP | 0.450 | | | | |
| 12 | IR-cut filter | Plano | | 0.210 | Glass | 1.517 | 64.2 | — |
| 13 | | Plano | | 0.216 | | | | |
| 14 | Image | Plano | | — | | | | |

Note:
Reference wavelength is 587.6 nm (d-line).

TABLE 4

Aspheric Coefficients

| | Surface # | | | | |
|---|---|---|---|---|---|
| | 2 | 3 | 4 | 5 | 6 |
| k = | −6.1481E+00 | 9.4348E+00 | −6.9408E−01 | −2.4401E+01 | −1.1167E+00 |
| A4 = | 1.0395E−01 | −7.7943E−01 | −9.1371E−01 | −1.6153E+00 | −2.0610E+00 |
| A6 = | −1.9222E+00 | −1.8662E+00 | 1.1373E+00 | 9.4052E−01 | 5.3342E+00 |
| A8 = | 7.9474E+00 | 3.1506E−01 | −2.8802E+01 | −3.4411E+00 | −3.3705E+00 |
| A10 = | −4.2722E+01 | 9.2736E+00 | 1.7709E+02 | 1.2051E+01 | 3.4375E+01 |
| A12 = | −6.3949E+01 | −6.1336E+01 | −5.6045E+02 | 9.6965E−01 | −1.1605E+02 |
| A14 = | 5.4655E+02 | 5.6165E+01 | 7.7262E+02 | −2.2780E+01 | 1.0846E+02 |
| A16 = | −9.7657E+02 | 8.8938E−01 | −7.1099E−02 | −1.5101E+01 | −1.1963E+01 |

| | Surface # | | | | |
|---|---|---|---|---|---|
| | 7 | 8 | 9 | 10 | 11 |
| k = | −1.4658E+00 | 2.3068E+01 | −9.1786E−01 | −1.7895E+00 | −3.4218E+00 |
| A4 = | −1.3573E+00 | 2.3530E+00 | 2.3417E+00 | −1.4174E+00 | −5.3828E−01 |
| A6 = | 3.2777E+00 | −1.1152E+01 | −4.1777E+00 | 2.8450E+00 | 8.4225E−01 |
| A8 = | −6.5027E−01 | 3.4741E+01 | 2.2700E+00 | −4.1957E+00 | −1.0536E+00 |
| A10 = | −2.3408E+00 | −7.3694E+01 | 2.0709E+00 | 3.7273E+00 | 7.9186E−01 |
| A12 = | 3.7763E+00 | 8.8055E+01 | −3.6651E+00 | −1.9180E+00 | −3.4540E−01 |
| A14 = | −4.2222E+00 | −4.5346E+01 | 1.8539E+00 | 5.2787E−01 | 7.7092E−02 |
| A16 = | 2.6677E+00 | 8.6201E−01 | −2.9840E−01 | −5.9031E−02 | −6.8118E−03 |

In the image capturing lens system according to the 2nd embodiment, the definitions of these parameters shown in the following table are the same as those stated in the 1st embodiment with corresponding values for the 2nd embodiment.

| 2nd Embodiment | | | |
|---|---|---|---|
| f [mm] | 1.88 | f/f4 + |f/f5| | 0.92 |
| Fno | 2.45 | (R5 − R6)/(R5 + R6) | −0.41 |
| HFOV [deg.] | 42.6 | R8/|R7| | −0.22 |
| V3/V4 | 0.42 | |R9 − R10|/(R9 + R10)| | 0.16 |
| CT4/CT3 | 1.36 | f1/f2 | 0.35 |
| Dr6r9/CT5 | 1.25 | f3/f4 | −0.73 |
| ΣCT/Td | 0.82 | |SAG42/SD42| | 0.04 |

3rd Embodiment

Figure 5:
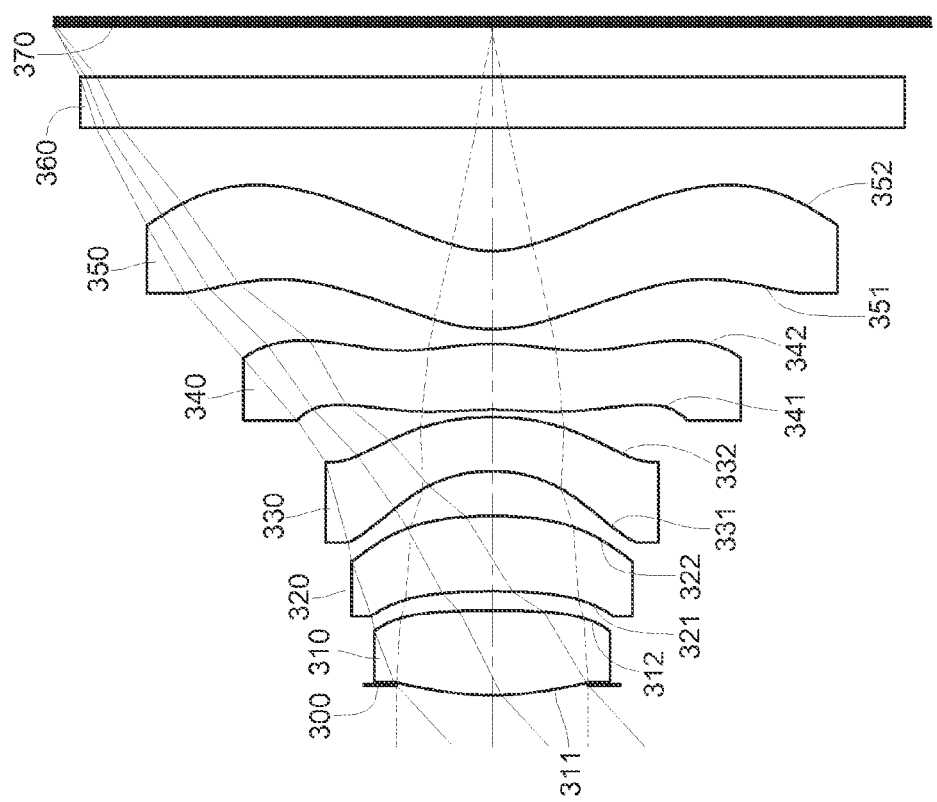
FIG. 5 is a schematic view of an image capturing lens system according to the 3rd embodiment of the present disclosure.
Figure 6:
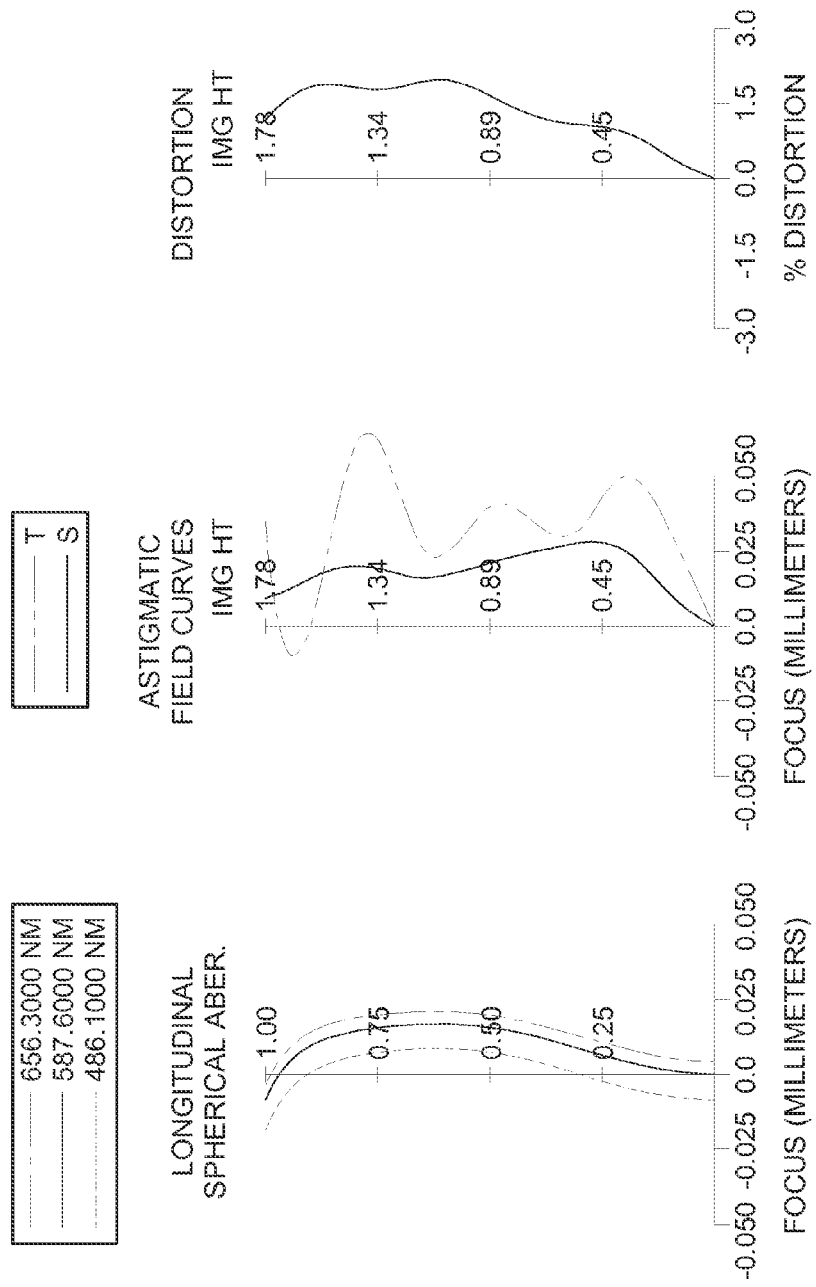
FIG. 6 shows spherical aberration curves, astigmatic field curves and a distortion curve of the image capturing lens system according to the 3rd embodiment.

FIG. 5 is a schematic view of an image capturing lens system according to the 3rd embodiment of the present disclosure. FIG. 6 shows spherical aberration curves, astigmatic field curves and a distortion curve of the image capturing lens system according to the 3rd embodiment. In FIG. 5, the image capturing lens system includes, in order from an object side to an image side, an aperture stop 300, a first lens element 310, a second lens element 320, a third lens element 330, a fourth lens element 340, a fifth lens element 350, an IR-cut filter 360 and an image plane 370. The image capturing lens system has a total of five lens elements (310-350) with refractive power.

The first lens element 310 with positive refractive power has a convex object-side surface 311 at a paraxial region and a convex image-side surface 312 at a paraxial region, and is made of plastic material. The object-side surface 311 and the image-side surface 312 of the first lens element 310 are aspheric.

The second lens element 320 with positive refractive power has a concave object-side surface 321 at a paraxial region and a convex image-side surface 322 at a paraxial region, and is made of plastic material. The object-side surface 321 and the image-side surface 322 of the second lens element 320 are aspheric.

The third lens element 330 with negative refractive power has a concave object-side surface 331 at a paraxial region and a convex image-side surface 332 at a paraxial region, and is made of plastic material. The object-side surface 331 and the image-side surface 332 of the third lens element 330 are aspheric.

The fourth lens element 340 with positive refractive power has a concave object-side surface 341 at a paraxial region and a convex image-side surface 342 at a paraxial region, and is made of plastic material. The object-side surface 341 and the image-side surface 342 of the fourth lens element 340 are aspheric. Furthermore, the image-side surface 342 of the fourth lens element 340 is convex at the paraxial region and changes to a concave shape and then a convex shape from the paraxial region to a peripheral region.

The fifth lens element 350 with negative refractive power has a convex object-side surface 351 at a paraxial region and a concave image-side surface 352 at a paraxial region, and is made of plastic material. The object-side surface 351 and the image-side surface 352 of the fifth lens element 350 are aspheric. Furthermore, the image-side surface 352 of the fifth lens element 350 has at least one convex shape at an off-axis region.

The IR-cut filter 360 is made of glass and located between the fifth lens element 350 and the image plane 370, and will not affect the focal length of the image capturing lens system.

The detailed optical data of the 3rd embodiment are shown in Table 5 and the aspheric surface data are shown in Table 6 below.

TABLE 5

3rd Embodiment
f = 1.91 mm, Fno = 2.45, HFOV = 42.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.042 | | | | |
| 2 | Lens 1 | 1.311 | ASP | 0.343 | Plastic | 1.544 | 55.9 | 2.11 |
| 3 | | −8.360 | ASP | 0.079 | | | | |
| 4 | Lens 2 | −3.391 | ASP | 0.309 | Plastic | 1.544 | 55.9 | 4.61 |
| 5 | | −1.489 | ASP | 0.181 | | | | |
| 6 | Lens 3 | −0.631 | ASP | 0.220 | Plastic | 1.640 | 23.3 | −2.56 |
| 7 | | −1.166 | ASP | 0.030 | | | | |
| 8 | Lens 4 | −1.945 | ASP | 0.268 | Plastic | 1.544 | 55.9 | 4.23 |
| 9 | | −1.106 | ASP | 0.060 | | | | |
| 10 | Lens 5 | 0.626 | ASP | 0.320 | Plastic | 1.544 | 55.9 | −21.87 |
| 11 | | 0.487 | ASP | 0.500 | | | | |
| 12 | IR-cut filter | Plano | | 0.210 | Glass | 1.517 | 64.2 | — |
| 13 | | Plano | | 0.202 | | | | |
| 14 | Image | Plano | | — | | | | |

Note:
Reference wavelength is 587.6 nm (d-line).

TABLE 6

Aspheric Coefficients

| | Surface # | | | | |
|---|---|---|---|---|---|
| | 2 | 3 | 4 | 5 | 6 |
| k = | −5.1704E+00 | −1.0000E+00 | −1.0181E+00 | −2.7625E+01 | −1.1527E+00 |
| A4 = | 1.4799E−01 | −8.5052E−01 | −8.8327E−01 | −1.5040E+00 | −2.0581E+00 |
| A6 = | −2.1188E+00 | −1.5278E+00 | 6.8418E−01 | 1.0712E+00 | 5.4641E+00 |
| A8 = | 6.7956E+00 | −7.4692E−01 | −2.8337E+00 | −3.4472E+00 | −2.9603E+00 |
| A10 = | −2.9551E+01 | 3.9841E+00 | 1.8399E+02 | 1.2209E+01 | 3.4737E+01 |
| A12 = | 5.3864E+00 | −4.6624E+01 | −5.5176E+02 | 2.9534E+00 | −1.1626E+02 |
| A14 = | −3.2247E+01 | 6.0611E+01 | 6.7767E+02 | −1.3722E+01 | 1.0991E+02 |

| | Surface # | | | | |
|---|---|---|---|---|---|
| | 7 | 8 | 9 | 10 | 11 |
| k = | −2.8007E+00 | −2.7254E+01 | −1.2199E+00 | −1.6392E+00 | −3.5223E+00 |
| A4 = | −1.3338E+00 | 2.5162E+00 | 2.4586E+00 | −1.3523E+00 | −4.7562E−01 |
| A6 = | 3.2707E+00 | −1.1448E+01 | −4.4087E+00 | 2.8451E+00 | 8.1006E−01 |
| A8 = | −6.1232E−01 | 3.4601E+01 | 2.3846E+00 | −4.1899E+00 | −1.0575E+00 |
| A10 = | −2.0662E+00 | −7.3631E+01 | 2.0821E+00 | 3.7297E+00 | 7.9821E−01 |
| A12 = | 4.4972E+00 | 8.8531E+01 | −3.6491E+00 | −1.9160E+00 | −3.4353E−01 |
| A14 = | −3.5919E+00 | −4.4757E+01 | 1.8248E+00 | 5.2744E−01 | 7.7835E−02 |
| A16 = | — | — | −3.0814E−01 | −6.0354E−02 | −7.0205E−03 |

In the image capturing lens system according to the 3rd embodiment, the definitions of these parameters shown in the following table are the same as those stated in the 1st embodiment with corresponding values for the 3rd embodiment.

| 3rd Embodiment | | | |
|---|---|---|---|
| f [mm] | 1.91 | f/f4 + \|f/f5\| | 0.54 |
| Fno | 2.45 | (R5 − R6)/(R5 + R6) | −0.30 |
| HFOV [deg.] | 42.6 | R8/\|R7\| | −0.57 |
| V3/V4 | 0.42 | \|(R9 − R10)/(R9 + R10)\| | 0.12 |
| CT4/CT3 | 1.22 | f1/f2 | 0.46 |
| Dr6r9/CT5 | 1.12 | f3/f4 | −0.60 |
| ΣCT/Td | 0.81 | \|SAG42/SD42\| | 0.05 |

4th Embodiment

Figure 7:
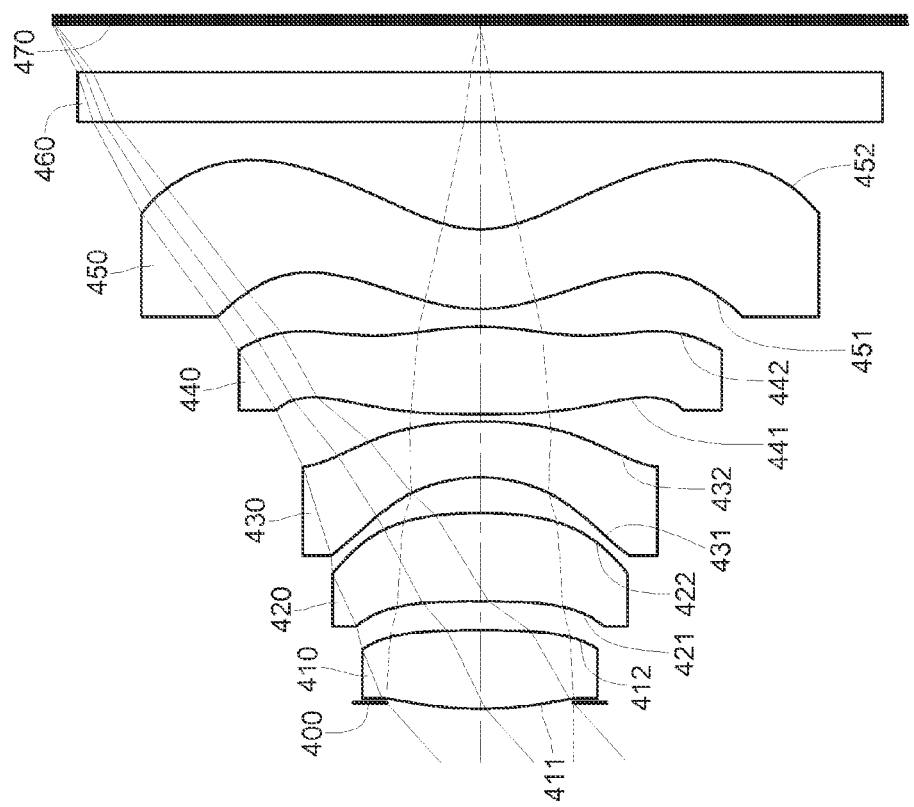
FIG. 7 is a schematic view of an image capturing lens system according to the 4th embodiment of the present disclosure.
Figure 8:
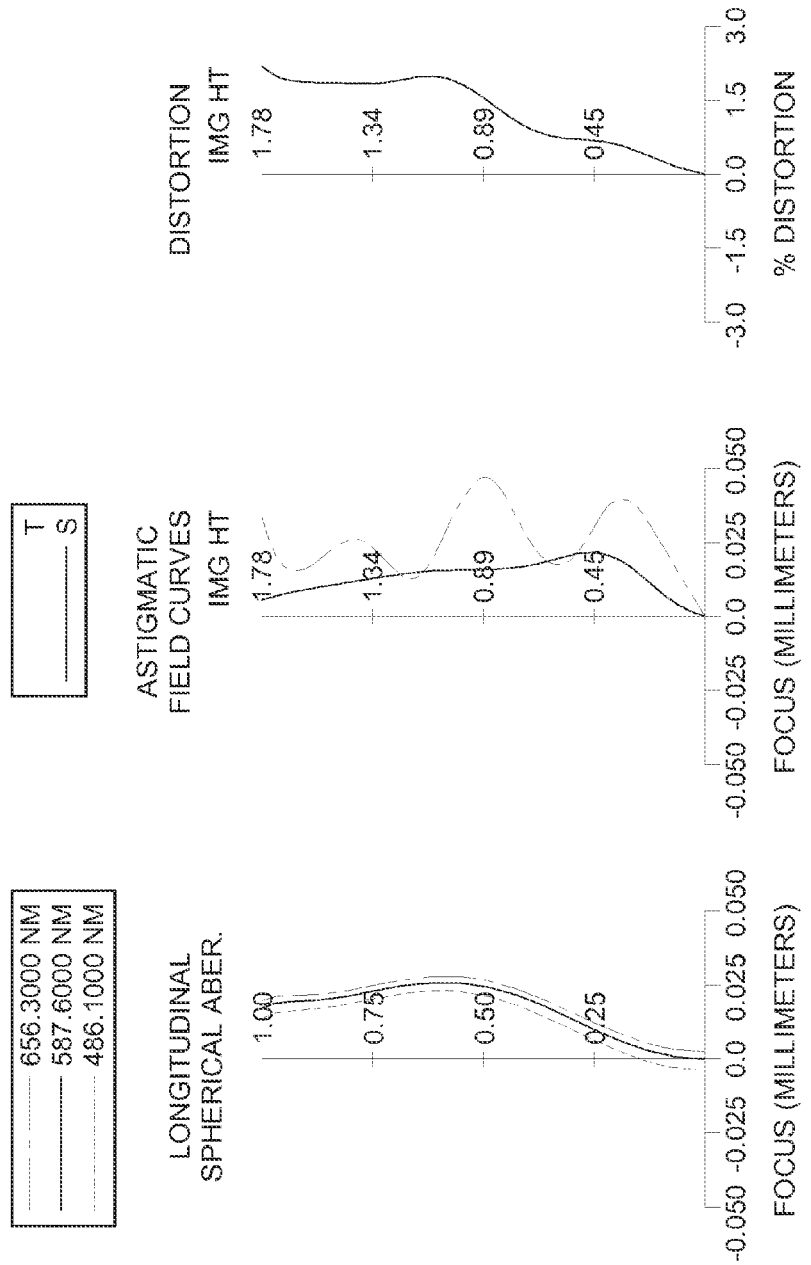
FIG. 8 shows spherical aberration curves, astigmatic field curves and a distortion curve of the image capturing lens system according to the 4th embodiment.

FIG. 7 is a schematic view of an image capturing lens system according to the 4th embodiment of the present disclosure. FIG. 8 shows spherical aberration curves, astigmatic field curves and a distortion curve of the image capturing lens system according to the 4th embodiment. In FIG. 7, the image capturing lens system includes, in order from an object side to an image side, an aperture stop 400, a first lens element 410, a second lens element 420, a third lens element 430, a fourth lens element 440, a fifth lens element 450, an IR-cut filter 460 and an image plane 470. The image capturing lens system has a total of five lens elements (410-450) with refractive power.

The first lens element 410 with positive refractive power has a convex object-side surface 411 at a paraxial region and a convex image-side surface 412 at a paraxial region, and is made of plastic material. The object-side surface 411 and the image-side surface 412 of the first lens element 410 are aspheric.

The second lens element 420 with positive refractive power has a concave object-side surface 421 at a paraxial region and a convex image-side surface 422 at a paraxial region, and is made of plastic material. The object-side surface 421 and the image-side surface 422 of the second lens element 420 are aspheric.

The third lens element 430 with negative refractive power has a concave object-side surface 431 at a paraxial region and a convex image-side surface 432 at a paraxial region, and is made of plastic material. The object-side surface 431 and the image-side surface 432 of the third lens element 430 are aspheric.

The fourth lens element 440 with positive refractive power has a convex object-side surface 441 at a paraxial region and a convex image-side surface 442 at a paraxial region, and is made of plastic material. The object-side surface 441 and the image-side surface 442 of the fourth lens element 440 are aspheric. Furthermore, the image-side surface 442 of the fourth lens element 440 is convex at the paraxial region and changes to a concave shape and then a convex shape from the paraxial region to a peripheral region.

The fifth lens element 450 with negative refractive power has a convex object-side surface 451 at a paraxial region and a concave image-side surface 452 at a paraxial region, and is made of plastic material. The object-side surface 451 and the image-side surface 452 of the fifth lens element 450 are aspheric. Furthermore, the image-side surface 452 of the fifth lens element 450 has at least one convex shape at an off-axis region.

The IR-cut filter 460 is made of glass and located between the fifth lens element 450 and the image plane 470, and will not affect the focal length of the image capturing lens system.

The detailed optical data of the 4th embodiment are shown in Table 7 and the aspheric surface data are shown in Table 8 below.

TABLE 7

4th Embodiment
f = 1.92 mm, Fno = 2.45, HFOV = 42.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.024 | | | | |
| 2 | Lens 1 | 1.521 | ASP | 0.329 | Plastic | 1.544 | 55.9 | 2.27 |
| 3 | | −6.123 | ASP | 0.122 | | | | |
| 4 | Lens 2 | −5.064 | ASP | 0.370 | Plastic | 1.544 | 55.9 | 5.05 |
| 5 | | −1.826 | ASP | 0.149 | | | | |
| 6 | Lens 3 | −0.722 | ASP | 0.235 | Plastic | 1.640 | 23.3 | −1.94 |
| 7 | | −1.952 | ASP | 0.032 | | | | |
| 8 | Lens 4 | 100.000 | ASP | 0.365 | Plastic | 1.544 | 55.9 | 2.01 |
| 9 | | −1.106 | ASP | 0.074 | | | | |
| 10 | Lens 5 | 0.694 | ASP | 0.334 | Plastic | 1.544 | 55.9 | −4.75 |
| 11 | | 0.454 | ASP | 0.450 | | | | |
| 12 | IR-cut filter | Plano | | 0.210 | Glass | 1.517 | 64.2 | — |
| 13 | | Plano | | 0.199 | | | | |
| 14 | Image | Plano | | — | | | | |

Note:
Reference wavelength is 587.6 nm (d-line).

TABLE 8

Aspheric Coefficients

| Surface # | | | | | |
|---|---|---|---|---|---|
| | 2 | 3 | 4 | 5 | 6 |
| k = | −7.4728E+00 | 2.9060E+01 | 2.4740E+01 | −3.9524E+01 | −9.7572E−01 |
| A4 = | 4.8149E−02 | −6.1820E−01 | −7.5193E−01 | −1.4607E+00 | −1.5128E+00 |
| A6 = | −1.0530E+00 | −1.4664E+00 | 5.5199E−01 | 3.4683E−01 | 2.9151E+00 |
| A8 = | 1.3498E+00 | 2.1912E+00 | −1.4125E+01 | −9.5408E−01 | −1.8138E+00 |
| A10 = | −1.5446E+01 | −8.8151E+00 | 6.0118E+01 | 2.7195E+00 | 1.4029E+01 |
| A12 = | 1.5168E+00 | −1.3288E+01 | −1.5745E+02 | 8.5184E−01 | −3.3164E+01 |
| A14 = | −7.3416E+00 | 1.3759E+01 | 1.5385E+02 | −3.1006E+00 | 2.4951E+01 |

| Surface # | | | | | |
|---|---|---|---|---|---|
| | 7 | 8 | 9 | 10 | 11 |
| k = | −1.6020E+00 | 4.9878E+01 | −1.2907E+00 | −1.5505E+00 | −3.3057E+00 |
| A4 = | −9.8828E−01 | 1.5259E+00 | 1.7816E+00 | −1.0739E+00 | −3.1818E−01 |
| A5 = | — | — | — | −4.4124E−02 | −9.1249E−02 |
| A6 = | 1.7444E+00 | −6.1669E+00 | −2.5550E+00 | 1.5574E+00 | 4.3955E−01 |
| A7 = | — | — | — | −5.5217E−03 | 1.9210E−02 |
| A8 = | −3.0619E−01 | 1.5651E+01 | 1.0092E+00 | −1.9012E+00 | −4.4383E−01 |
| A9 = | — | — | — | 2.2217E−03 | −2.8865E−03 |
| A10 = | −7.8476E−01 | −2.6781E+01 | 7.4644E−01 | 1.3490E+00 | 2.8088E−01 |
| A11 = | — | — | — | 6.8971E−03 | −5.0124E−04 |
| A12 = | 1.1050E+00 | 2.5028E+01 | −1.0213E+00 | −5.3570E−01 | −9.9184E−02 |
| A13 = | — | — | — | 3.6743E−03 | −2.2926E−04 |
| A14 = | −4.1576E−01 | −9.8112E+00 | 4.2213E−01 | 1.2509E−01 | 1.7240E−02 |
| A15 = | — | — | — | −9.1809E−04 | 1.1508E−04 |
| A16 = | — | — | −4.5201E−02 | −1.5717E−02 | −1.1121E−03 |

In the image capturing lens system according to the 4th embodiment, the definitions of these parameters shown in the following table are the same as those stated in the 1st embodiment with corresponding values for the 4th embodiment.

| 4th Embodiment | | | |
|---|---|---|---|
| f [mm] | 1.92 | f/f4 + \|f/f5\| | 1.36 |
| Fno | 2.45 | (R5 − R6)/(R5 + R6) | −0.46 |
| HFOV [deg.] | 42.1 | R8/\|R7\| | −0.01 |
| V3/V4 | 0.42 | \|(R9 − R10)/(R9 + R10)\| | 0.21 |
| CT4/CT3 | 1.55 | f1/f2 | 0.45 |
| Dr6r9/CT5 | 1.41 | f3/f4 | −0.96 |
| ΣCT/Td | 0.81 | \|SAG42/SD42\| | 0.09 |

5th Embodiment

Figure 9:
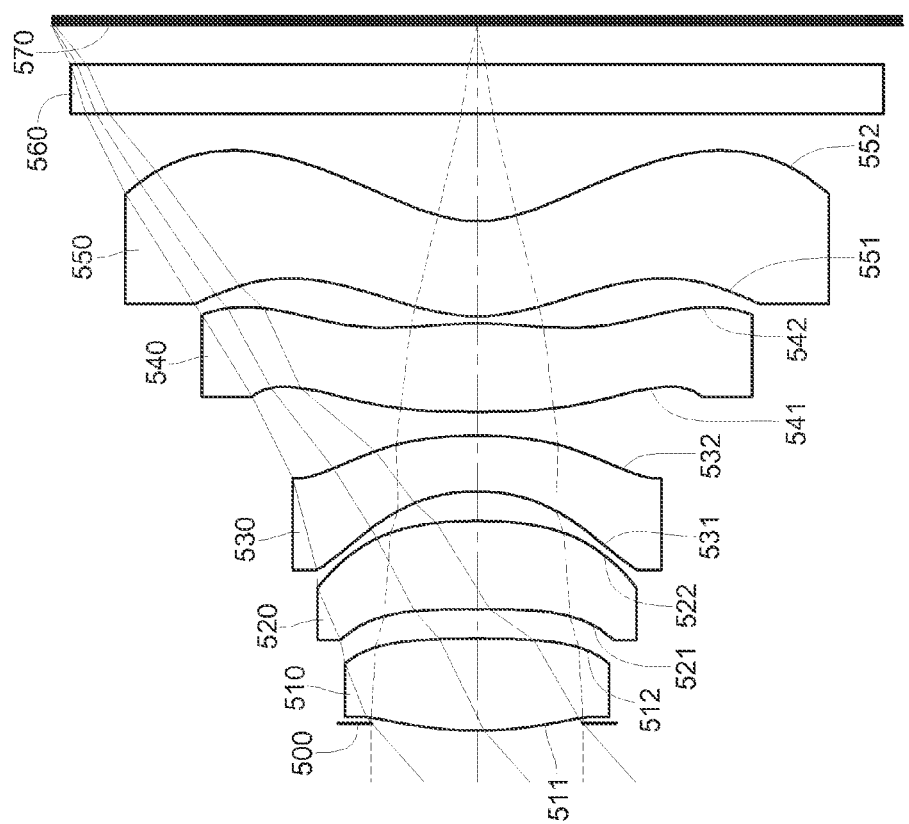
FIG. 9 is a schematic view of an image capturing lens system according to the 5th embodiment of the present disclosure.
Figure 10:
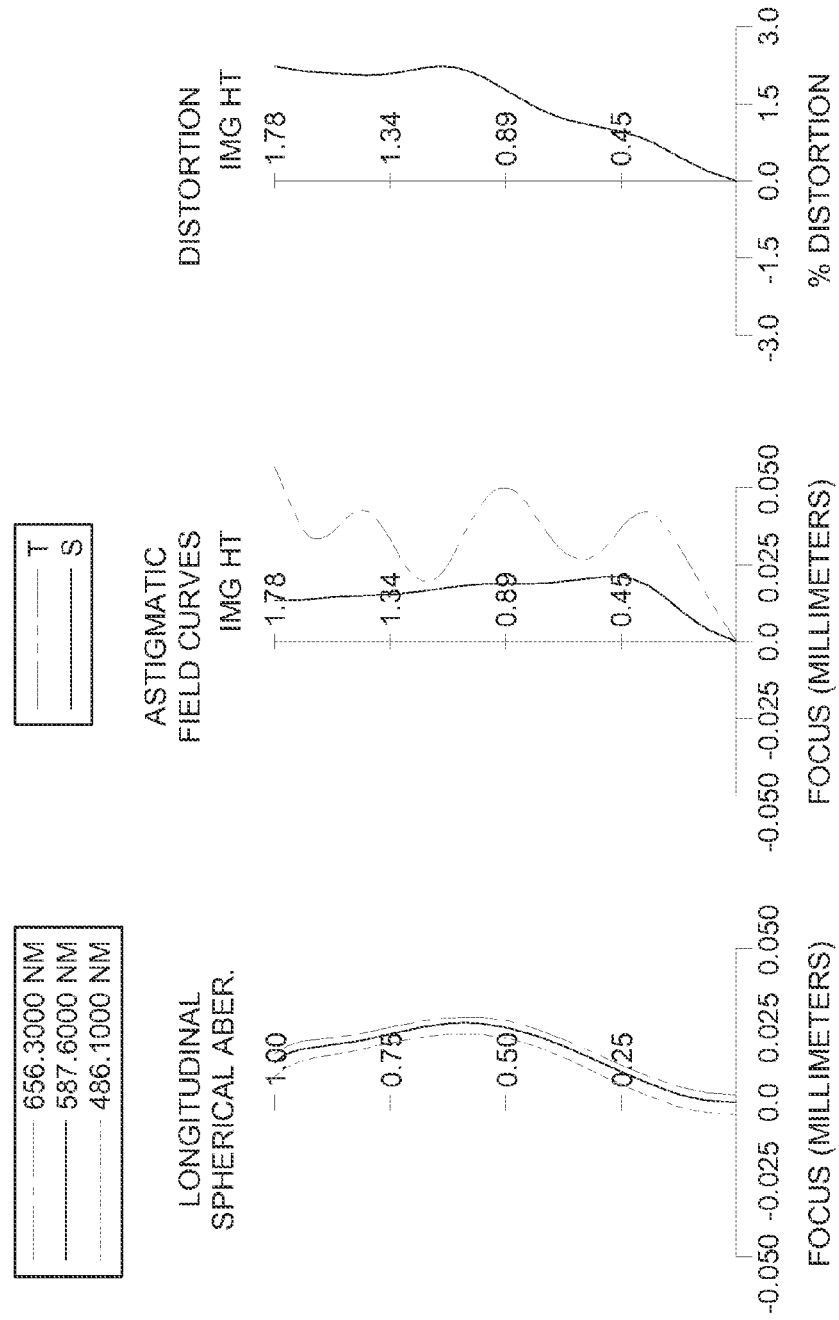
FIG. 10 shows spherical aberration curves, astigmatic field curves and a distortion curve of the image capturing lens system according to the 5th embodiment.

FIG. 9 is a schematic view of an image capturing lens system according to the 5th embodiment of the present disclosure. FIG. 10 shows spherical aberration curves, astigmatic field curves and a distortion curve of the image capturing lens system according to the 5th embodiment. In FIG. 9, the image capturing lens system includes, in order from an object side to an image side, an aperture stop 500, a first lens element 510, a second lens element 520, a third lens element 530, a fourth lens element 540, a fifth lens element 550, an IR-cut filter 560 and an image plane 570. The image capturing lens system has a total of five lens elements (510-550) with refractive power.

The first lens element 510 with positive refractive power has a convex object-side surface 511 at a paraxial region and a convex image-side surface 512 at a paraxial region, and is made of plastic material. The object-side surface 511 and the image-side surface 512 of the first lens element 510 are aspheric.

The second lens element 520 with positive refractive power has a concave object-side surface 521 at a paraxial region and a convex image-side surface 522 at a paraxial region, and is made of plastic material. The object-side surface 521 and the image-side surface 522 of the second lens element 520 are aspheric.

The third lens element 530 with negative refractive power has a concave object-side surface 531 at a paraxial region and a convex image-side surface 532 at a paraxial region, and is made of plastic material. The object-side surface 531 and the image-side surface 532 of the third lens element 530 are aspheric.

The fourth lens element 540 with positive refractive power has a convex object-side surface 541 at a paraxial region and a convex image-side surface 542 at a paraxial region, and is made of plastic material. The object-side surface 541 and the image-side surface 542 of the fourth lens element 540 are aspheric. Furthermore, the image-side surface 542 of the fourth lens element 540 is convex at the paraxial region and changes to a concave shape and then a convex shape from the paraxial region to a peripheral region.

The fifth lens element 550 with negative refractive power has a convex object-side surface 551 at a paraxial region and a concave image-side surface 552 at a paraxial region, and is made of plastic material. The object-side surface 551 and the image-side surface 552 of the fifth lens element 550 are aspheric. Furthermore, the image-side surface 552 of the fifth lens element 550 has at least one convex shape at an off-axis region.

The IR-cut filter 560 is made of glass and located between the fifth lens element 550 and the image plane 570, and will not affect the focal length of the image capturing lens system.

The detailed optical data of the 5th embodiment are shown in Table 9 and the aspheric surface data are shown in Table 10 below.

TABLE 9

5th Embodiment
f = 1.95 mm, Fno = 2.20, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.033 | | | | |
| 2 | Lens 1 | 1.525 | ASP | 0.386 | Plastic | 1.544 | 55.9 | 2.41 |
| 3 | | −8.582 | ASP | 0.126 | | | | |
| 4 | Lens 2 | −5.792 | ASP | 0.371 | Plastic | 1.544 | 55.9 | 4.30 |
| 5 | | −1.705 | ASP | 0.124 | | | | |
| 6 | Lens 3 | −0.756 | ASP | 0.235 | Plastic | 1.640 | 23.3 | −2.18 |
| 7 | | −1.855 | ASP | 0.100 | | | | |
| 8 | Lens 4 | 11.388 | ASP | 0.372 | Plastic | 1.544 | 55.9 | 2.72 |
| 9 | | −1.683 | ASP | 0.030 | | | | |
| 10 | Lens 5 | 0.751 | ASP | 0.400 | Plastic | 1.544 | 55.9 | −7.83 |
| 11 | | 0.519 | ASP | 0.450 | | | | |
| 12 | IR-cut filter | Plano | | 0.210 | Glass | 1.517 | 64.2 | — |
| 13 | | Plano | | 0.164 | | | | |
| 14 | Image | Plano | | — | | | | |

Note:
Reference wavelength is 587.6 nm (d-line).

TABLE 10

Aspheric Coefficients

| | Surface # | | | | |
|---|---|---|---|---|---|
| | 2 | 3 | 4 | 5 | 6 |
| k = | −6.3759E+00 | −1.0000E+00 | 4.2131E+01 | −2.9402E+01 | −1.4645E+00 |
| A4 = | 7.3145E−02 | −5.6635E−01 | −6.4812E−01 | −1.1576E+00 | −1.0988E+00 |
| A6 = | −8.1882E−01 | −9.9107E−01 | 1.8318E−01 | 3.1980E−01 | 1.8334E+00 |
| A8 = | 1.4701E+00 | 6.1919E−01 | −7.9932E+00 | −3.1887E−01 | −1.1691E+00 |
| A10 = | −8.3775E+00 | −1.6820E+00 | 2.9895E+01 | 7.9343E−01 | 6.8117E+00 |
| A12 = | 6.0383E−01 | −5.2268E+00 | −6.1855E+01 | 3.3108E−01 | −1.3033E+01 |
| A14 = | −2.4284E+00 | 4.5644E+00 | 5.1032E+01 | −1.0333E+00 | 8.2767E+00 |

| | Surface # | | | | |
|---|---|---|---|---|---|
| | 7 | 8 | 9 | 10 | 11 |
| k = | −2.0698E+00 | −5.0000E+01 | −4.2359E−01 | −1.5493E+00 | −3.2294E+00 |
| A4 = | −7.3930E−01 | 1.1857E+00 | 1.3545E+00 | −9.2564E−01 | −3.3556E−01 |
| A6 = | 1.2322E+00 | −4.0424E+00 | −1.6096E+00 | 1.0721E+00 | 3.1934E−01 |
| A8 = | −1.1999E−01 | 8.7039E+00 | 5.7426E−01 | −1.0220E+00 | −2.6151E−01 |
| A10 = | −3.7829E−01 | −1.2478E+01 | 3.4706E−01 | 6.2624E−01 | 1.3098E−01 |
| A12 = | 3.3982E−01 | 9.8189E+00 | −4.0731E−01 | −2.1394E−01 | −3.9025E−02 |
| A14 = | 9.0467E−02 | −3.2394E+00 | 1.3874E−01 | 3.9632E−02 | 6.2807E−03 |
| A16 = | — | — | −1.5753E−02 | −3.8746E−03 | −4.0416E−04 |

In the image capturing lens system according to the 5th embodiment, the definitions of these parameters shown in the following table are the same as those stated in the 1st embodiment with corresponding values for the 5th embodiment.

| 5th Embodiment | | | |
|---|---|---|---|
| f [mm] | 1.95 | f/f4 + |f/f5| | 0.97 |
| Fno | 2.20 | (R5 − R6)/(R5 + R6) | −0.42 |
| HFOV [deg.] | 41.6 | R8/|R7| | −0.15 |
| V3/V4 | 0.42 | |(R9 − R10)/(R9 + R10)| | 10.18 |
| CT4/CT3 | 1.58 | f1/f2 | 0.56 |
| Dr6r9/CT5 | 1.26 | f3/f4 | −0.80 |
| ΣCT/Td | 0.82 | |SAG42/SD42| | 0.03 |

6th Embodiment

Figure 11:
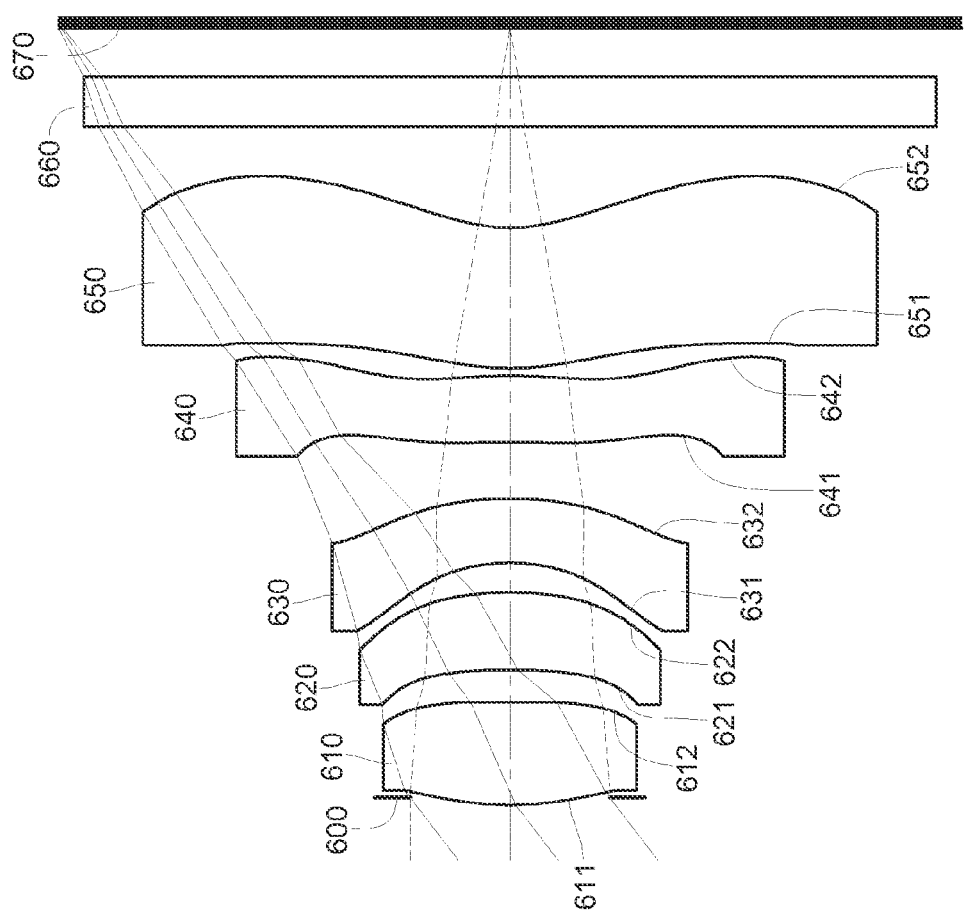
FIG. 11 is a schematic view of an image capturing lens system according to the 6th embodiment of the present disclosure.
Figure 12:
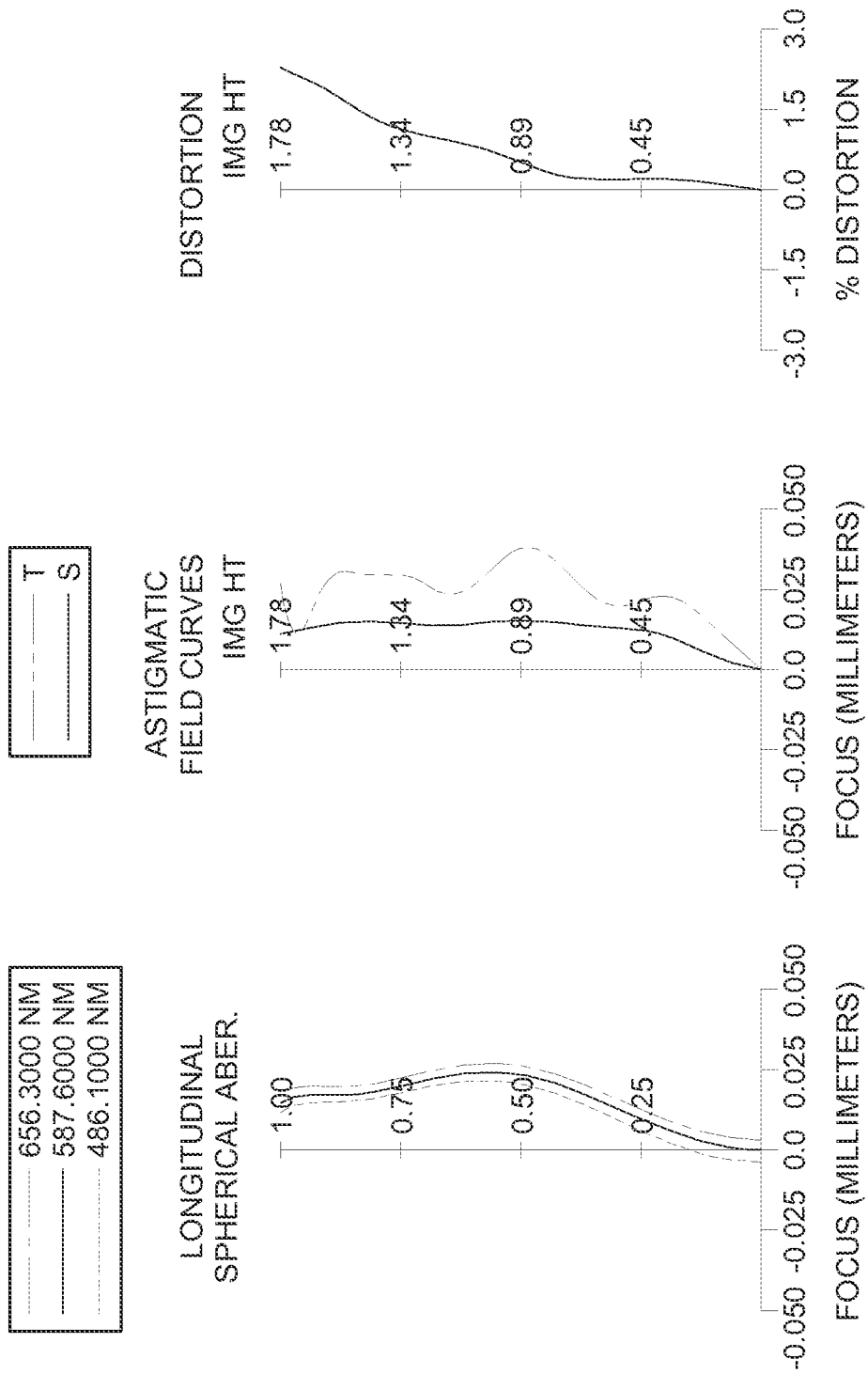
FIG. 12 shows spherical aberration curves, astigmatic field curves and a distortion curve of the image capturing lens system according to the 6th embodiment.

FIG. 11 is a schematic view of an image capturing lens system according to the 6th embodiment of the present disclosure. FIG. 12 shows spherical aberration curves, astigmatic field curves and a distortion curve of the image capturing lens system according to the 6th embodiment. In FIG. 11, the image capturing lens system includes, in order from an object side to an image side, an aperture stop 600, a first lens element 610, a second lens element 620, a third lens element 630, a fourth lens element 640, a fifth lens element 650, an IR-cut filter 660 and an image plane 670. The image capturing lens system has a total of five lens elements (610-650) with refractive power.

The first lens element 610 with positive refractive power has a convex object-side surface 611 at a paraxial region and a convex image-side surface 612 at a paraxial region, and is made of glass material. The object-side surface 611 and the image-side surface 612 of the first lens element 610 are aspheric.

The second lens element 620 with positive refractive power has a concave object-side surface 621 at a paraxial region and a convex image-side surface 622 at a paraxial region, and is made of plastic material. The object-side surface 621 and the image-side surface 622 of the second lens element 620 are aspheric.

The third lens element 630 with negative refractive power has a concave object-side surface 631 at a paraxial region and a convex image-side surface 632 at a paraxial region, and is made of plastic material. The object-side surface 631 and the image-side surface 632 of the third lens element 630 are aspheric.

The fourth lens element 640 with positive refractive power has a concave object-side surface 641 at a paraxial region and a convex image-side surface 642 at a paraxial region, and is made of plastic material. The object-side surface 641 and the image-side surface 642 of the fourth lens element 640 are aspheric. Furthermore, the image-side surface 642 of the fourth lens element 640 is convex at the paraxial region and changes to a concave shape and then a convex shape from the paraxial region to a peripheral region.

The fifth lens element 650 with negative refractive power has a convex object-side surface 651 at a paraxial region and a concave image-side surface 652 at a paraxial region, and is made of plastic material. The object-side surface 651 and the image-side surface 652 of the fifth lens element 650 are aspheric. Furthermore, the image-side surface 652 of the fifth lens element 650 has at least one convex shape at an off-axis region.

The IR-cut filter 660 is made of glass and located between the fifth lens element 650 and the image plane 670, and will not affect the focal length of the image capturing lens system.

The detailed optical data of the 6th embodiment are shown in Table 11 and the aspheric surface data are shown in Table 12 below.

TABLE 11

6th Embodiment
f = 2.26 mm, Fno = 2.85, HFOV = 37.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.028 | | | | |
| 2 | Lens 1 | 1.368 | ASP | 0.410 | Glass | 1.542 | 62.9 | 2.11 |
| 3 | | −6.314 | ASP | 0.127 | | | | |
| 4 | Lens 2 | −2.827 | ASP | 0.308 | Plastic | 1.565 | 55.0 | 4.83 |
| 5 | | −1.443 | ASP | 0.118 | | | | |
| 6 | Lens 3 | −0.788 | ASP | 0.256 | Plastic | 1.639 | 23.5 | −2.96 |
| 7 | | −1.523 | ASP | 0.225 | | | | |
| 8 | Lens 4 | −3.699 | ASP | 0.264 | Plastic | 1.544 | 55.9 | 6.10 |
| 9 | | −1.793 | ASP | 0.030 | | | | |
| 10 | Lens 5 | 1.080 | ASP | 0.559 | Plastic | 1.535 | 55.7 | −5.79 |
| 11 | | 0.657 | ASP | 0.400 | | | | |
| 12 | IR-cut filter | Plano | | 0.200 | Glass | 1.517 | 64.2 | — |
| 13 | | Plano | | 0.195 | | | | |
| 14 | Image | Plano | | — | | | | |

Note:
Reference wavelength is 587.6 nm (d-line).

TABLE 12

Aspheric Coefficients

| Surface # | | | | | |
|---|---|---|---|---|---|
| | 2 | 3 | 4 | 5 | 6 |
| k = | −5.7098E+00 | −1.0000E+00 | 1.5418E+01 | −1.4018E+01 | −1.2184E+00 |
| A4 = | 1.3437E−01 | −5.7203E−01 | −7.1061E−01 | −1.3492E+00 | −1.4665E+00 |
| A6 = | −6.9821E−01 | −1.8638E+00 | −9.3307E−02 | 6.2996E−01 | 3.1491E+00 |
| A8 = | 1.0554E+00 | 2.2807E+00 | −1.5228E+00 | −7.2984E−01 | −1.7416E+00 |
| A10 = | −1.2818E+01 | −9.9060E+00 | 6.0044E+01 | 2.6396E+00 | 1.3695E+01 |
| A12 = | 1.6224E+00 | −1.4043E+01 | −1.6619E+02 | 8.8958E−01 | −3.5017E+01 |
| A14 = | −7.8089E+00 | 1.4678E+01 | 1.6411E+02 | −3.3228E+00 | 2.6616E+01 |

| Surface # | | | | | |
|---|---|---|---|---|---|
| | 7 | 8 | 9 | 10 | 11 |
| k = | −8.1479E+00 | −1.3903E+01 | 5.2707E−01 | −1.6875E+00 | −4.8549E+00 |
| A4 = | −9.7040E−01 | 1.8000E+00 | 1.6889E+00 | −1.0165E+00 | −3.7038E−01 |
| A6 = | 1.7705E+00 | −6.7271E+00 | −2.4898E+00 | 1.7134E+00 | 4.8840E−01 |
| A8 = | −3.7644E−01 | 1.6070E+01 | 1.1331E+00 | −1.9326E+00 | −4.9057E−01 |
| A10 = | −9.1882E−01 | −2.7548E+01 | 7.8596E−01 | 1.3979E+00 | 2.9742E−01 |
| A12 = | 1.2299E+00 | 2.6650E+01 | −1.0965E+00 | −5.8205E−01 | −1.0368E−01 |
| A14 = | 1.5313E−01 | −1.0938E+01 | 4.4055E−01 | 1.2541E−01 | 1.9102E−02 |
| A16 = | — | — | −6.4589E−02 | −1.4842E−02 | −1.4870E−03 |

In the image capturing lens system according to the 6th embodiment, the definitions of these parameters shown in the following table are the same as those stated in the 1st embodiment with corresponding values for the 6th embodiment.

| 6th Embodiment | | | |
|---|---|---|---|
| f [mm] | 2.26 | f/f4 + \|f/f5\| | 0.76 |
| Fno | 2.85 | (R5 − R6)/(R5 + R6) | −0.32 |
| HFOV [deg.] | 37.5 | R8/\|R7\| | −0.48 |
| V3/V4 | 0.42 | \|(R9 − R10)/(R9 + R10)\| | 0.24 |
| CT4/CT3 | 1.03 | f1/f2 | 0.44 |
| Dr6r9/CT5 | 0.93 | f3/f4 | −0.48 |
| ΣCT/Td | 0.78 | \|SAG42/SD42\| | 0.05 |

7th Embodiment

Figure 13:
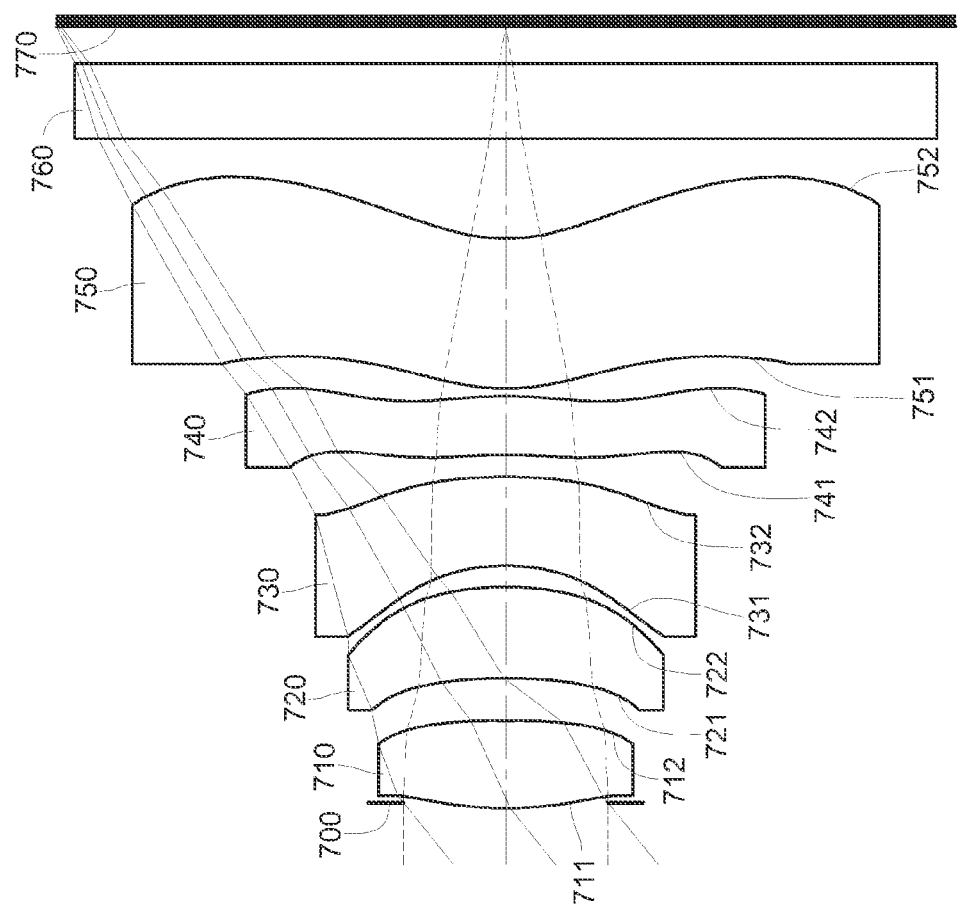
FIG. 13 is a schematic view of an image capturing lens system according to the 7th embodiment of the present disclosure.
Figure 14:
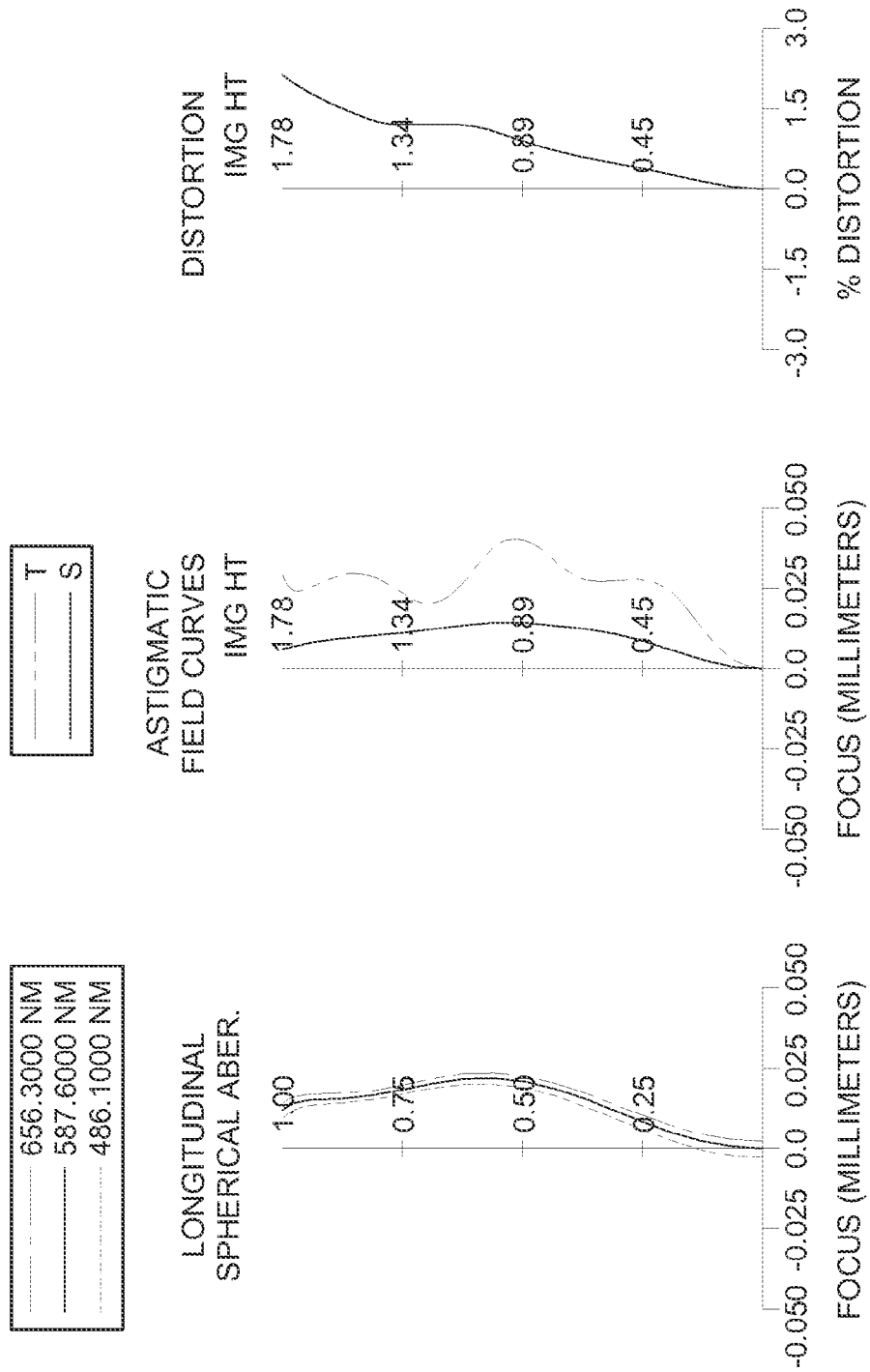
FIG. 14 shows spherical aberration curves, astigmatic field curves and a distortion curve of the image capturing lens system according to the 7th embodiment.

FIG. 13 is a schematic view of an image capturing lens system according to the 7th embodiment of the present disclosure. FIG. 14 shows spherical aberration curves, astigmatic field curves and a distortion curve of the image capturing lens system according to the 7th embodiment. In FIG. 13, the image capturing lens system includes, in order from an object side to an image side, an aperture stop 700, a first lens element 710, a second lens element 720, a third lens element 730, a fourth lens element 740, a fifth lens element 750, an IR-cut filter 760 and an image plane 770. The image capturing lens system has a total of five lens elements (710-750) with refractive power.

The first lens element 710 with positive refractive power has a convex object-side surface 711 at a paraxial region and a convex image-side surface 712 at a paraxial region, and is made of plastic material. The object-side surface 711 and the image-side surface 712 of the first lens element 710 are aspheric.

The second lens element 720 with positive refractive power has a concave object-side surface 721 at a paraxial region and a convex image-side surface 722 at a paraxial region, and is made of plastic material. The object-side surface 721 and the image-side surface 722 of the second lens element 720 are aspheric.

The third lens element 730 with negative refractive power has a concave object-side surface 731 at a paraxial region and a convex image-side surface 732 at a paraxial region, and is made of plastic material. The object-side surface 731 and the image-side surface 732 of the third lens element 730 are aspheric.

The fourth lens element 740 with positive refractive power has a concave object-side surface 741 at a paraxial region and a convex image-side surface 742 at a paraxial region, and is made of plastic material. The object-side surface 741 and the image-side surface 742 of the fourth lens element 740 are aspheric. Furthermore, the image-side surface 742 of the fourth lens element 740 is convex at the paraxial region and changes to a concave shape and then a convex shape from the paraxial region to a peripheral region.

The fifth lens element 750 with positive refractive power has a convex object-side surface 751 at a paraxial region and a concave image-side surface 752 at a paraxial region, and is made of plastic material. The object-side surface 751 and the image-side surface 752 of the fifth lens element 750 are aspheric. Furthermore, the image-side surface 752 of the fifth lens element 750 has at least one convex shape at an off-axis region.

The IR-cut filter 760 is made of glass and located between the fifth lens element 750 and the image plane 770, and will not affect the focal length of the image capturing lens system.

The detailed optical data of the 7th embodiment are shown in Table 13 and the aspheric surface data are shown in Table 14 below.

TABLE 13

7th Embodiment
f = 2.16 mm, Fno = 2.65, HFOV = 38.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.022 | | | | |
| 2 | Lens 1 | 1.460 | ASP | 0.350 | Plastic | 1.544 | 55.9 | 1.91 |
| 3 | | −3.284 | ASP | 0.169 | | | | |
| 4 | Lens 2 | −2.145 | ASP | 0.365 | Plastic | 1.544 | 55.9 | 4.67 |
| 5 | | −1.233 | ASP | 0.084 | | | | |
| 6 | Lens 3 | −0.862 | ASP | 0.354 | Plastic | 1.640 | 23.3 | −2.23 |
| 7 | | −2.525 | ASP | 0.089 | | | | |
| 8 | Lens 4 | −1.761 | ASP | 0.234 | Plastic | 1.544 | 55.9 | 16.61 |
| 9 | | −1.543 | ASP | 0.030 | | | | |
| 10 | Lens 5 | 0.832 | ASP | 0.599 | Plastic | 1.544 | 55.9 | 13.98 |
| 11 | | 0.697 | ASP | 0.400 | | | | |
| 12 | IR-cut filter | Plano | | 0.300 | Glass | 1.517 | 64.2 | — |
| 13 | | Plano | | 0.150 | | | | |
| 14 | Image | Plano | | — | | | | |

Note:
Reference wavelength is 587.6 nm (d-line).

TABLE 14

Aspheric Coefficients

| | Surface # | | | | |
|---|---|---|---|---|---|
| | 2 | 3 | 4 | 5 | 6 |
| k = | −7.0148E+00 | −5.0000E+01 | −1.3882E+01 | −1.2724E+01 | −1.1761E+00 |
| A4 = | 9.4745E−02 | −5.5064E−01 | −4.9913E−01 | −1.2374E+00 | −1.3413E+00 |
| A6 = | −1.0377E+00 | −1.1857E+00 | 3.0202E−01 | 4.7879E−01 | 2.6204E+00 |
| A8 = | 1.5695E+00 | 1.6404E+00 | −1.1353E+01 | −9.2022E−01 | −1.5028E+00 |
| A10 = | −1.5320E+01 | −8.5920E+00 | 4.4082E+01 | 3.3198E+00 | 9.6737E+00 |
| A12 = | 1.1215E+00 | −9.7985E+00 | −1.1520E+02 | −4.7939E−01 | −2.3962E+01 |
| A14 = | −5.0663E+00 | 9.5226E+00 | 1.0647E+02 | −8.3765E+00 | 1.7381E+01 |

| | Surface # | | | | |
|---|---|---|---|---|---|
| | 7 | 8 | 9 | 10 | 11 |
| k = | −5.5874E+00 | −5.0000E+01 | −7.8824E−01 | −2.8042E+00 | −3.7464E+00 |
| A4 = | −8.6927E−01 | 1.5795E+00 | 1.5796E+00 | −9.0088E−01 | −3.5209E−01 |
| A6 = | 1.5257E+00 | −5.6449E+00 | −2.2189E+00 | 1.4353E+00 | 4.2447E−01 |
| A8 = | −3.1413E−01 | 1.2788E+01 | 8.9487E−01 | −1.5399E+00 | −3.8755E−01 |
| A10 = | −6.9540E−01 | −2.0501E+01 | 6.0618E−01 | 1.0396E+00 | 2.1815E−01 |
| A12 = | 7.7291E−01 | 1.8404E+01 | −7.4746E−01 | −3.9950E−01 | −7.1642E−02 |
| A14 = | 3.9400E−02 | −6.9367E+00 | 2.8554E−01 | 8.1205E−02 | 1.2328E−02 |
| A16 = | — | — | −5.1438E−02 | −9.9984E−03 | −8.5600E−04 |

In the image capturing lens system according to the 7th embodiment, the definitions of these parameters shown in the following table are the same as those stated in the 1st embodiment with corresponding values for the 7th embodiment.

| 7th Embodiment | | | |
|---|---|---|---|
| f [mm] | 2.16 | f/f4 + |f/f5| | 0.29 |
| Fno | 2.65 | (R5 − R6)/(R5 + R6) | −0.49 |
| HFOV [deg.] | 38.8 | R8/|R7| | −0.88 |
| V3/V4 | 0.42 | |(R9 − R10)/(R9 + R10)| | 0.09 |
| CT4/CT3 | 0.66 | f1/f2 | 0.41 |
| Dr6r9/CT5 | 0.59 | f3/f4 | −0.13 |
| ΣCT/Td | 0.84 | |SAG42/SD42| | 0.01 |

8th Embodiment

Figure 15:
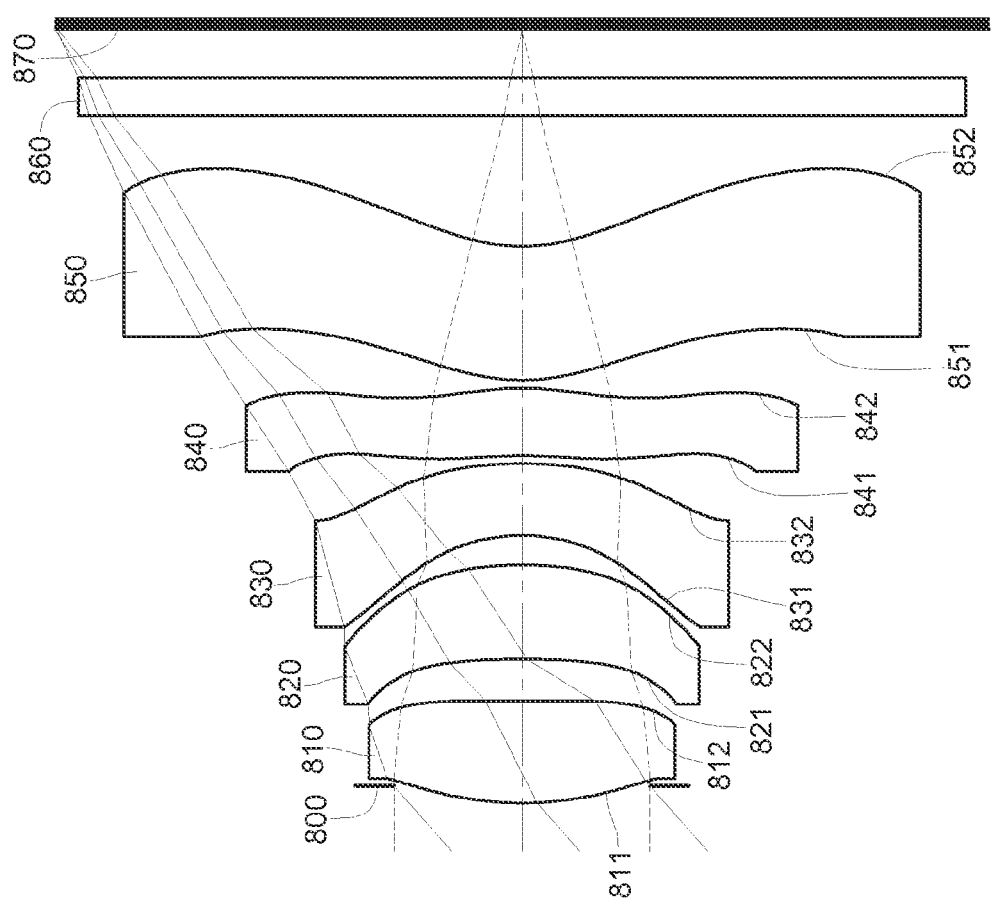
FIG. 15 is a schematic view of an image capturing lens system according to the 8th embodiment of the present disclosure.
Figure 16:
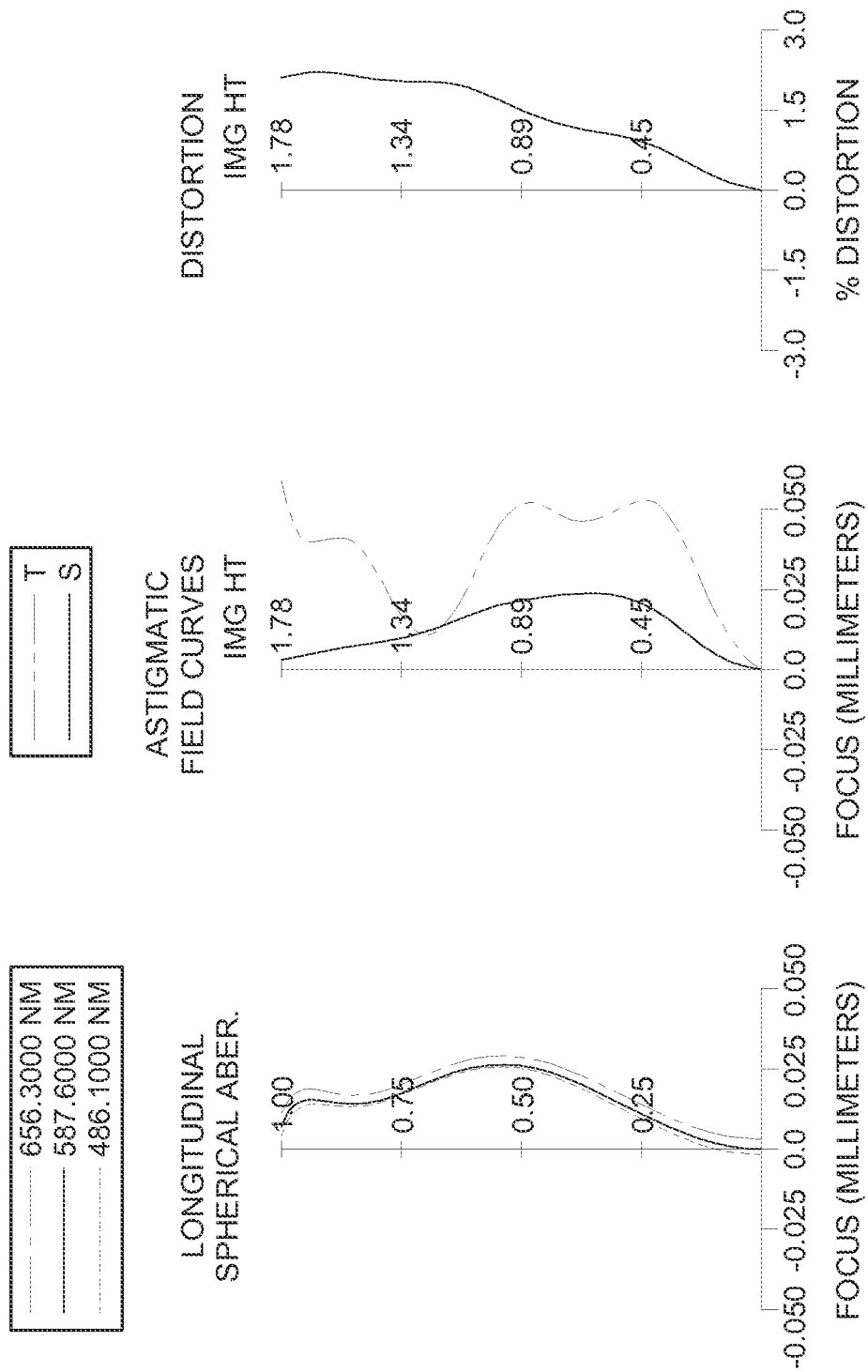
FIG. 16 shows spherical aberration curves, astigmatic field curves and a distortion curve of the image capturing lens system according to the 8th embodiment.

FIG. 15 is a schematic view of an image capturing lens system according to the 8th embodiment of the present disclosure. FIG. 16 shows spherical aberration curves, astigmatic field curves and a distortion curve of the image capturing lens system according to the 8th embodiment. In FIG. 15, the image capturing lens system includes, in order from an object side to an image side, an aperture stop 800, a first lens element 810, a second lens element 820, a third lens element 830, a fourth lens element 840, a fifth lens element 850, an IR-cut filter 860 and an image plane 870. The image capturing lens system has a total of five lens elements (810-850) with refractive power.

The first lens element 810 with positive refractive power has a convex object-side surface 811 at a paraxial region and a concave image-side surface 812 at a paraxial region, and is made of plastic material. The object-side surface 811 and the image-side surface 812 of the first lens element 810 are aspheric.

The second lens element 820 with positive refractive power has a concave object-side surface 821 at a paraxial region and a convex image-side surface 822 at a paraxial region, and is made of plastic material. The object-side surface 821 and the image-side surface 822 of the second lens element 820 are aspheric.

The third lens element 830 with negative refractive power has a concave object-side surface 831 at a paraxial region and a convex image-side surface 832 at a paraxial region, and is made of plastic material. The object-side surface 831 and the image-side surface 832 of the third lens element 830 are aspheric.

The fourth lens element 840 with positive refractive power has a concave object-side surface 841 at a paraxial region and a convex image-side surface 842 at a paraxial region, and is made of plastic material. The object-side surface 841 and the image-side surface 842 of the fourth lens element 840 are aspheric. Furthermore, the image-side surface 842 of the fourth lens element 840 is convex at the paraxial region and changes to a concave shape and then a convex shape from the paraxial region to a peripheral region.

The fifth lens element 850 with positive refractive power has a convex object-side surface 851 at a paraxial region and a concave image-side surface 852 at a paraxial region, and is made of plastic material. The object-side surface 851 and the image-side surface 852 of the fifth lens element 850 are aspheric. Furthermore, the image-side surface 852 of the fifth lens element 850 has at least one convex shape at an off-axis region.

The IR-cut filter 860 is made of glass and located between the fifth lens element 850 and the image plane 870, and will not affect the focal length of the image capturing lens system.

The detailed optical data of the 8th embodiment are shown in Table 15 and the aspheric surface data are shown in Table 16 below.

TABLE 15

8th Embodiment
f = 1.96 mm, Fno = 2.00, HFOV = 41.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.065 | | | | |
| 2 | Lens 1 | 1.280 | ASP | 0.391 | Plastic | 1.544 | 55.9 | 2.38 |
| 3 | | 109.234 | ASP | 0.159 | | | | |
| 4 | Lens 2 | −3.668 | ASP | 0.361 | Plastic | 1.544 | 55.9 | 3.63 |
| 5 | | −1.328 | ASP | 0.113 | | | | |
| 6 | Lens 3 | −0.730 | ASP | 0.275 | Plastic | 1.650 | 21.4 | −2.18 |
| 7 | | −1.730 | ASP | 0.030 | | | | |
| 8 | Lens 4 | −1.628 | ASP | 0.258 | Plastic | 1.544 | 55.9 | 6.20 |
| 9 | | −1.159 | ASP | 0.031 | | | | |
| 10 | Lens 5 | 0.740 | ASP | 0.512 | Plastic | 1.544 | 55.9 | 9.41 |
| 11 | | 0.654 | ASP | 0.500 | | | | |
| 12 | IR-cut filter | Plano | | 0.145 | Glass | 1.517 | 64.2 | — |
| 13 | | Plano | | 0.186 | | | | |
| 14 | Image | Plano | | — | | | | |

Note:
Reference wavelength is 587.6 nm (d-line).

TABLE 16

Aspheric Coefficients

| | Surface # | | | | |
|---|---|---|---|---|---|
| | 2 | 3 | 4 | 5 | 6 |
| k = | −4.2225E+00 | −5.0000E+01 | −3.4871E+00 | −2.3403E+01 | −1.4485E+00 |
| A4 = | 2.1229E−01 | −3.0267E−01 | −5.5526E−01 | −1.3468E+00 | −1.3041E+00 |
| A6 = | −1.0049E+00 | −1.3758E+00 | −2.7841E+00 | 4.1771E−01 | 2.5468E+00 |
| A8 = | 3.8220E+00 | 2.0741E+00 | −1.1983E+01 | −5.1512E−01 | −1.7437E+00 |
| A10 = | −1.1053E+01 | −4.4681E+00 | 5.0684E+01 | 4.4218E+00 | 9.5904E+00 |
| A12 = | 1.1219E+00 | −9.8230E+00 | −1.1589E+02 | −4.7699E−01 | −2.3958E+01 |
| A14 = | −5.0358E+00 | 1.0333E+01 | 1.0860E+02 | −8.3713E+00 | 1.7390E+01 |

| | Surface # | | | | |
|---|---|---|---|---|---|
| | 7 | 8 | 9 | 10 | 11 |
| k = | −1.9992E+00 | −5.0000E+01 | −1.2775E+00 | −1.9501E+00 | −3.3724E+00 |
| A4 = | −8.8793E−01 | 1.5418E+00 | 1.6123E+00 | −9.2205E−01 | −3.4427E−01 |
| A6 = | 1.5081E+00 | −5.6594E+00 | −2.2215E+00 | 1.4519E+00 | 4.3174E−01 |
| A8 = | −3.4818E−01 | 1.2899E+01 | 8.8692E−01 | −1.5479E+00 | −3.9114E−01 |
| A10 = | −7.2301E−01 | −2.0484E+01 | 6.0771E−01 | 1.0319E+00 | 2.1712E−01 |
| A12 = | 7.8797E−01 | 1.8392E+01 | −7.4506E−01 | −4.0192E−01 | −7.0872E−02 |
| A14 = | 2.2959E−01 | −6.8817E+00 | 2.8320E−01 | 8.2972E−02 | 1.2306E−02 |
| A16 = | — | — | −5.5024E−02 | −7.6822E−03 | −8.8804E−04 |

In the image capturing lens system according to the 8th embodiment, the definitions of these parameters shown in the following table are the same as those stated in the 1st embodiment with corresponding values for the 8th embodiment.

| 8th Embodiment | | | |
|---|---|---|---|
| f [mm] | 1.96 | f/f4 + |f/f5| | 0.52 |
| Fno | 2.00 | (R5 − R6)/(R5 + R6) | −0.41 |
| HFOV [deg.] | 41.5 | R8/|R7| | −0.71 |
| V3/V4 | 0.38 | |(R9 − R10)/(R9 + R10)| | 0.06 |
| CT4/CT3 | 0.94 | f1/f2 | 0.66 |
| Dr6r9/CT5 | 0.62 | f3/f4 | −0.35 |
| ΣCT/Td | 0.84 | |SAG42/SD42| | 0.05 |

It is to be noted that TABLES 1-16 show different data of the different embodiments; however, the data of the different embodiments are obtained from experiments. Therefore, any optical system of the same structure is considered to be less than or equal to the scope of the present disclosure even if it uses different data. The embodiments depicted above and the appended drawings are exemplary and are not intended to limit the scope of the present disclosure.

What is claimed is:

1. An image capturing lens system comprising, in order from an object side to an image side:
   a first lens element with positive refractive power having a convex object-side surface at a paraxial region;
   a second lens element with positive refractive power having a concave object-side surface at a paraxial region and a convex image-side surface at a paraxial region;
   a third lens element with negative refractive power having a concave object-side surface at a paraxial region and a convex image-side surface at a paraxial region;
   a fourth lens element with positive refractive power having a convex image-side surface at a paraxial region; and a fifth lens element with refractive power having a concave image-side surface at a paraxial region, wherein both of an object-side surface and the image-side surface of the fifth lens element are aspheric, and the image-side surface of the fifth lens element has at least one convex shape at an off-axis region;

wherein the image capturing lens system has a total of five lens elements with refractive power, a focal length of the image capturing lens system is f, a focal length of the fourth lens element is f4, a focal length of the fifth lens element is f5, a curvature radius of an object-side surface of the fourth lens element is R7, a curvature radius of the image-side surface of the fourth lens element is R8, a central thickness of the third lens element is CT3, a central thickness of the fourth lens element is CT4, and the following relationships are satisfied:

$$0 < |f/f4 + |f/f5|| < 3.0;$$

$$-1.5 < R8/|R7| < 0; \text{ and}$$

$$0.3 < CT4/CT3 < 1.6.$$

2. The image capturing lens system of claim 1, wherein the object-side surface of the fifth lens element is convex at a paraxial region.

3. The image capturing lens system of claim 2, wherein the first lens element has a convex image-side surface at a paraxial region.

4. The image capturing lens system of claim 3, wherein the focal length of the image capturing lens system is f, the focal length of the fourth lens element is f4, the focal length of the fifth lens element is f5, and the following relationship is satisfied:

$$0.2 \leq |f/f4 + |f/f5|| < 1.5.$$

5. The image capturing lens system of claim 3, wherein a sum of a central thickness of the first lens element, a central thickness of the second lens element, the central thickness of the third lens element, the central thickness of the fourth lens element and a central thickness of the fifth lens element is ΣCT, an axial distance between the object-side surface of the first lens element and the image-side surface of the fifth lens element is Td, and the following relationship is satisfied:

$$0.75 < \Sigma CT/Td < 0.95.$$

6. The image capturing lens system of claim 2, wherein a distance in parallel with an optical axis from a maximum effective diameter position on the image-side surface of the fourth lens element to an axial vertex on the image-side surface of the fourth lens element is SAG42, a vertical distance between the maximum effective diameter position on the image-side surface of the fourth lens element and the optical axis is SD42, and the following relationship is satisfied:

$$|SAG42/SD42| < 0.25.$$

7. The image capturing lens system of claim 1, wherein a focal length of the first lens element is f1, a focal length of the second lens element is f2, and the following relationship is satisfied:

$$0 < f1/f2 < 1.0.$$

8. The image capturing lens system of claim 7, wherein the curvature radius of the object-side surface of the fourth lens element is R7, the curvature radius of the image-side surface of the fourth lens element is R8, and the following relationship is satisfied:

$$-1.0 < R8/|R7| < 0.$$

9. The image capturing lens system of claim 8, wherein an axial distance between the image-side surface of the third lens element and the object-side surface of the fifth lens element is Dr6r9, a central thickness of the fifth lens element is CT5, and the following relationship is satisfied:

$$0.5 < Dr6r9/CT5 < 1.3.$$

10. The image capturing lens system of claim 8, wherein a curvature radius of the object-side surface of the third lens element is R5, a curvature radius of the image-side surface of the third lens element is R6, and the following relationship is satisfied:

$$-0.60 < (R5-R6)/(R5+R6) < -0.15.$$

11. The image capturing lens system of claim 2, wherein a focal length of the third lens element is f3, the focal length of the fourth lens element is f4, and the following relationship is satisfied:

$$-1.0 < f3/f4 < 0.$$

12. The image capturing lens system of claim 11, wherein an Abbe number of the third lens element is V3, an Abbe number of the fourth lens element is V4, and the following relationship is satisfied:

$$0.2 < V3/V4 < 0.6.$$

13. The image capturing lens system of claim 11, further comprising:
a stop located between an object and the first lens element.

14. The image capturing lens system of claim 13, wherein the image-side surface of the fourth lens element is convex at the paraxial region and changes to a concave shape and then a convex shape from the paraxial region to a peripheral region.

15. An image capturing lens system comprising, in order from an object side to an image side:
a first lens element having positive refractive power;
a second lens element with positive refractive power having a concave object-side surface at a paraxial region and a convex image-side surface at a paraxial region;
a third lens element with negative refractive power having a concave object-side surface at a paraxial region;
a fourth lens element having positive refractive power; and
a fifth lens element with refractive power having a concave image-side surface at a paraxial region, wherein both of an object-side surface and the image-side surface of the fifth lens element are aspheric, and the image-side surface of the fifth lens element has at least one convex shape at an off-axis region;

wherein the image capturing lens system has a total of five lens elements with refractive power, a focal length of the image capturing lens system is f, a focal length of the first lens element is f1, a focal length of the second lens element is f2, a focal length of the fourth lens element is f4, a focal length of the fifth lens element is f5, and the following relationships are satisfied:

$$0.2 \leq |f/f4 + |f/f5|| < 1.0; \text{ and}$$

$$0 < f1/f2.$$

16. The image capturing lens system of claim 15, wherein a curvature radius of the object-side surface of the fifth lens element is R9, a curvature radius of the image-side surface of the fifth lens element is R10, and the following relationship is satisfied:

$$0 < |(R9-R10)/(R9+R10)| < 0.5.$$

17. The image capturing lens system of claim 15, wherein a curvature radius of the object-side surface of the third lens element is R5, a curvature radius of an image-side surface of the third lens element is R6, and the following relationship is satisfied:

$-0.60<(R5-R6)/(R5+R6)<-0.15.$

18. The image capturing lens system of claim 15, wherein the third lens element has a convex image-side surface at a paraxial region.

19. The image capturing lens system of claim 15, wherein a curvature radius of an object-side surface of the fourth lens element is R7, a curvature radius of an image-side surface of the fourth lens element is R8, and the following relationship is satisfied:

$-1.0<R8/|R7|<0.$

20. The image capturing lens system of claim 15, an image-side surface of the fourth lens element is convex at a paraxial region and changes to a concave shape and then a convex shape from the paraxial region to a peripheral region.

21. The image capturing lens system of claim 15, wherein the focal length of the first lens element is f1, the focal length of the second lens element is f2, and the following relationship is satisfied:

$0<f1/f2<1.0.$

22. The image capturing lens system of claim 15, wherein a focal length of the third lens element is f3, the focal length of the fourth lens element is f4, and the following relationship is satisfied:

$-1.0<f3/f4<0.$

23. The image capturing lens system of claim 15, wherein an axial distance between an image-side surface of the third lens element and the object-side surface of the fifth lens element is Dr6r9, a central thickness of the fifth lens element is CT5, and the following relationship is satisfied:

$0.5<Dr6r9/CT5<1.3.$

24. The image capturing lens system of claim 15, wherein the first lens element has a convex object-side surface at a paraxial region and a convex image-side surface at a paraxial region.

* * * * *